US008798371B2

(12) United States Patent
Yoshino

(10) Patent No.: US 8,798,371 B2
(45) Date of Patent: Aug. 5, 2014

(54) IMAGE PROCESSING METHOD, IMAGE PROCESSING APPARATUS, AND IMAGE FORMING APPARATUS

(75) Inventor: Hiroki Yoshino, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 383 days.

(21) Appl. No.: 13/354,937

(22) Filed: Jan. 20, 2012

(65) Prior Publication Data
US 2012/0121184 A1 May 17, 2012

Related U.S. Application Data

(62) Division of application No. 12/138,268, filed on Jun. 12, 2008, now Pat. No. 8,121,414.

(30) Foreign Application Priority Data

Jun. 13, 2007 (JP) .................................. 2007-156719
May 14, 2008 (JP) .................................. 2008-127532

(51) Int. Cl.
G06K 9/46 (2006.01)
G06K 9/66 (2006.01)
G06K 9/38 (2006.01)

(52) U.S. Cl.
USPC ............ 382/194; 382/190; 382/270; 382/271

(58) Field of Classification Search
USPC ................................ 382/192, 194, 270, 271
See application file for complete search history.

(56) References Cited

U.S. PATENT DOCUMENTS

| 4,757,551 | A | 7/1988 | Kobayashi et al. |
| 5,621,815 | A | 4/1997 | Talukdar et al. |
| 5,799,115 | A | 8/1998 | Asano et al. |
| 5,995,676 | A | 11/1999 | Campbell et al. |
| 6,064,773 | A | 5/2000 | Yamagata |
| 6,266,156 | B1 | 7/2001 | Tanimura et al. |
| 6,381,374 | B1 | 4/2002 | Pourjavid |
| 6,608,929 | B1 | 8/2003 | Shiratani |
| 7,916,944 | B2 | 3/2011 | Yang et al. |
| 2005/0036687 | A1 | 2/2005 | Ishiguro |
| 2005/0220336 | A1 | 10/2005 | Sabe et al. |
| 2006/0164691 | A1 | 7/2006 | Adachi |
| 2007/0253623 | A1 | 11/2007 | Ohira et al. |

FOREIGN PATENT DOCUMENTS

| CN | 1809117 A | 7/2006 |
| JP | 8-255236 A | 10/1996 |
| JP | 2005-284348 A | 10/2005 |
| JP | 2007-299210 A | 11/2007 |
| WO | WO 2006/092957 A1 | 9/2006 |

*Primary Examiner* — John Strege
(74) *Attorney, Agent, or Firm* — Birch, Stewart, Kolasch & Birch, LLP

(57) ABSTRACT

The number of pixels in an identified pixel region is counted, a feature point of the pixel region is extracted and the number of the feature points is counted when the number of the pixels counted has been determined to be equal to or higher than a first threshold value, whether the counted number of the feature points is equal to or lower than a second threshold value is determined, features is calculated based on the feature point extracted from the pixel region when the number of the feature points has been determined to be above the second threshold value, and the first threshold value is changed when the number of the feature points has been determined to be equal to or lower than the second threshold value. Image similarity determination process can be stably performed without any degradation in determination accuracy.

12 Claims, 39 Drawing Sheets

FIG. 16

| REGION | LOWER LIMIT OF THRESHOLD VALUE |
|---|---|
| 1 | 200 |
| 2 | 30 |
| 3 | 30 |
| 4 | 200 |
| ⋮ | ⋮ |

FIG. 17

| DIVISION NUMBER | LOWER LIMIT OF THRESHOLD VALUE 1 | LOWER LIMIT OF THRESHOLD VALUE 2 | LOWER LIMIT OF THRESHOLD VALUE 3 | LOWER LIMIT OF THRESHOLD VALUE 4 | ... |
|---|---|---|---|---|---|
| 1 | 100 | (NONUSE) | (NONUSE) | (NONUSE) | ... |
| 2 | 100 | 100 | (NONUSE) | (NONUSE) | ... |
| 3 | 100 | 30 | 100 | (NONUSE) | ... |
| 4 | 100 | 30 | 30 | 100 | ... |
| ...... | ...... | ...... | ...... | ...... | |

F I G. 2 8
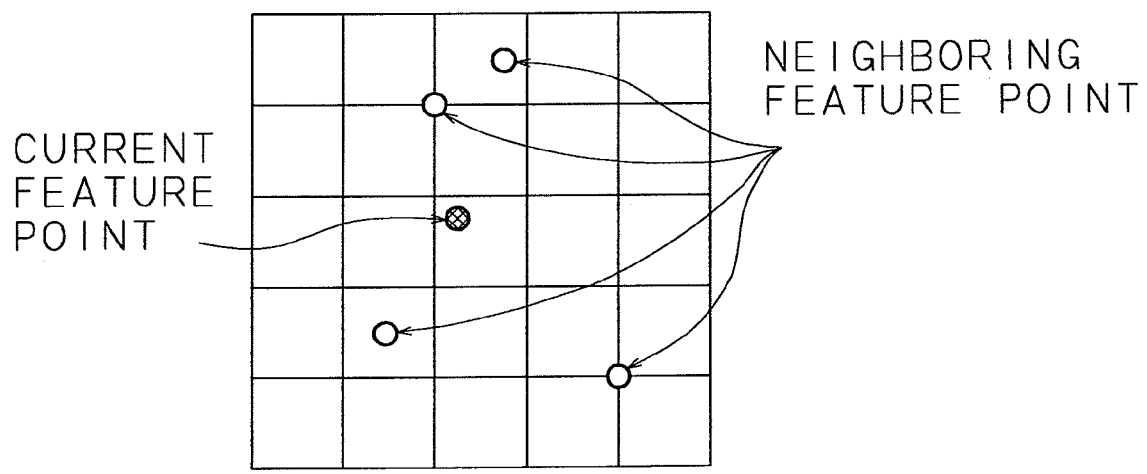

F I G. 3 4
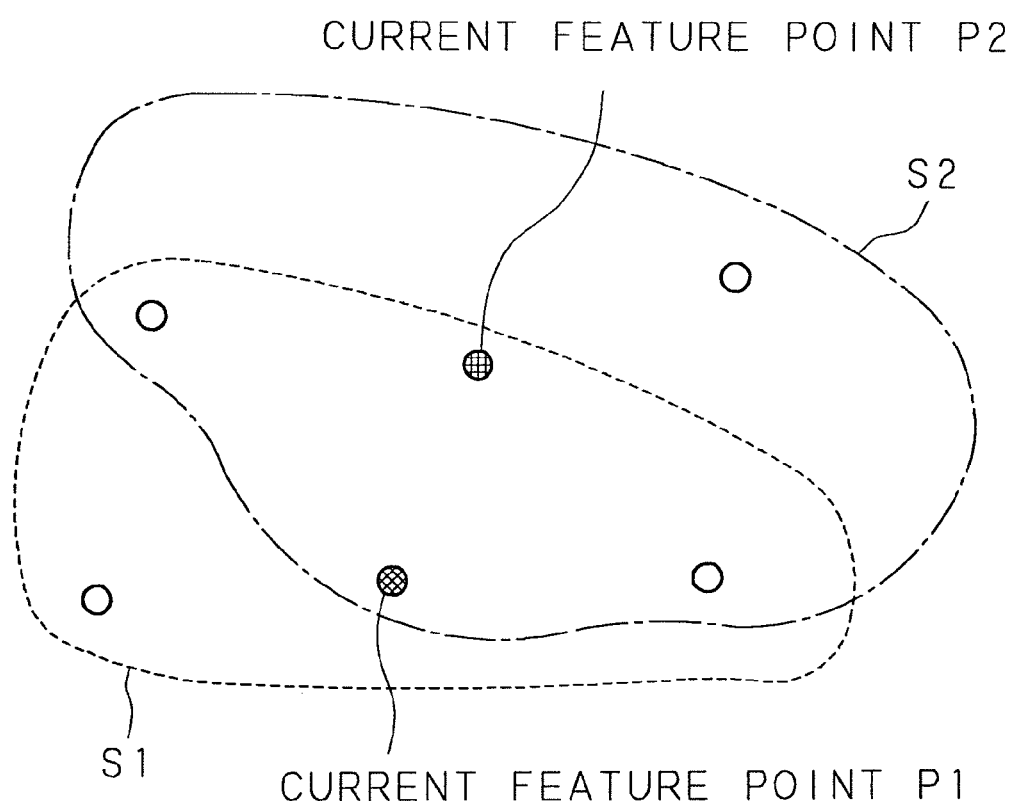

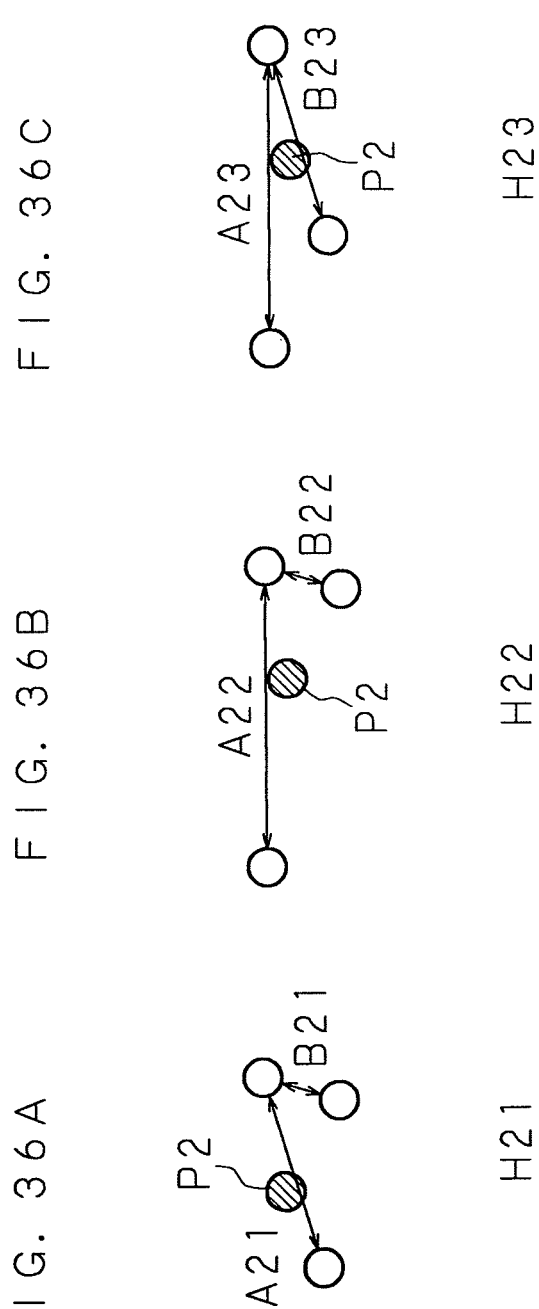

FIG. 37A

| HASH VALUE | INDEX INDICATIVE OF DOCUMENT |
|---|---|
| H11 | ID1 |
| H12 | ID1 |
| H13 | ID1, ID2 |
| H21 | ID1 |
| H22 | ID1 |
| H23 | ID1, ID2 |
| ⋮ | ⋮ |

FIG. 37B

| HASH VALUE | INDEX INDICATIVE OF DOCUMENT |
|---|---|
| H11 | ID1, ID1 |
| H12 | ID1 |
| H13 | ID1, ID2 |
| H21 | ID1 |
| H23 | ID1, ID2 |
| ⋮ | ⋮ |

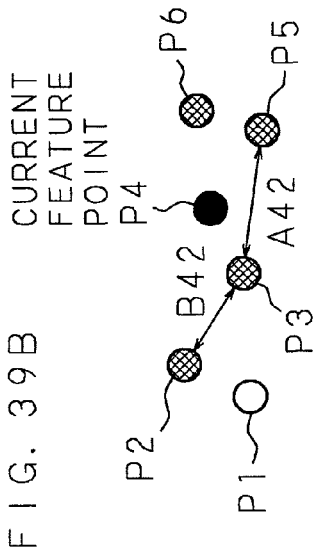
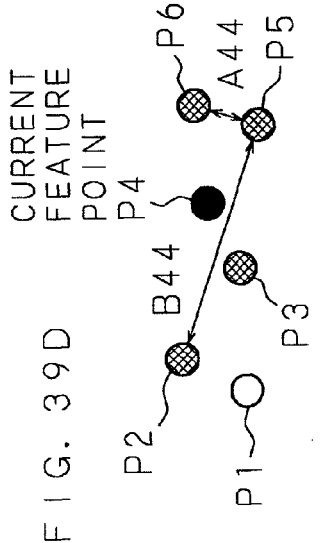
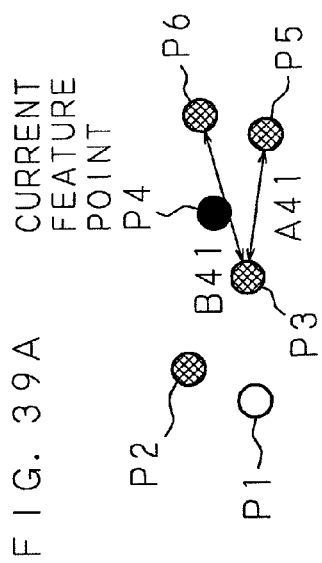
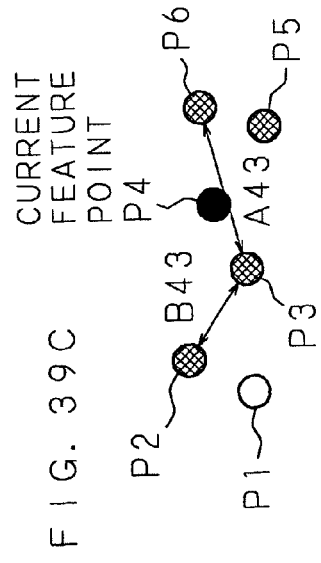

IMAGE PROCESSING METHOD, IMAGE PROCESSING APPARATUS, AND IMAGE FORMING APPARATUS

CROSS-REFERENCE TO RELATED APPLICATIONS

This application is a divisional of U.S. patent application Ser. No. 12/138,268 filed on Jun. 12, 2008, now U.S. Pat. No. 8,121,414, which claims priority under 35 U.S.C. §119(a) on Patent Application No. 2007-156719 filed in Japan on Jun. 13, 2007 and Patent Application No. 2008-127532 filed in Japan on May 14, 2008, the entire contents of which are hereby incorporated by reference.

BACKGROUND OF THE INVENTION

The present invention relates to an image processing method, an image processing apparatus, and an image forming apparatus for determining image similarity, and in particular relates to an image processing method, an image processing apparatus, and an image forming apparatus which are capable of improving the accuracy of determining similarity of images with a few feature points.

Conventionally, there has been used a technique for comparing input image data, obtained by reading a document image using a scanner, with a stored image stored in advance to determine similarity therebetween, and for controlling, based on the determination result, processes (such as copying, transmission, and editing, for example) performed on the input image data.

Known similarity determination methods include: a method in which keywords are extracted from images by an OCR (Optical Character Reader) or the like, for example, and matching is performed based on the keywords; and a method in which target images are restricted to formatted images having ruled lines, and matching is performed based on features of the ruled lines (for example, Japanese Patent Application Laid-Open No. 8-255236).

Further, International Publication Pamphlet No. 2006/092957 discloses a technique in which a plurality of feature points are extracted from a digital image, sets of local feature points are determined for the respective feature points extracted, subsets of feature points are selected from among the respective sets determined, invariants for geometric conversion are each obtained, as an amount that characterizes each selected subset, based on a plurality of combinations of feature points in the subsets, the respective invariants obtained are combined to calculate features, and voting is performed for document(s)/image(s) in a database based on the calculated features, thereby searching for the document(s)/image(s) associated with the above-mentioned digital image.

SUMMARY OF THE INVENTION

FIG. 1 is an explanatory diagram showing a centroid of a connected component, and FIG. 2 is an explanatory diagram showing an example in which a centroid serves as a feature point. A centroid of a connected component is unlikely to be susceptible to a noise, and even when rotation or parallel movement of a target image has occurred, the position thereof does not change; thus, an image processing method, in which features is calculated using a centroid as a feature point and image similarity determination is performed based on the calculated features, is deemed to be capable of realizing high-accuracy image similarity determination unsusceptible to disturbance.

However, in this method, the number of feature points might be small since the number of calculated centroids becomes small depending on a document to be inputted. Further, when features is calculated using a small number of feature points, feature points required for the calculation cannot be sufficiently secured, thereby causing a problem that the accuracy of the calculated features itself is degraded.

The present invention has been made in view of the above-described circumstances, and its object is to provide an image processing method, an image processing apparatus, and an image forming apparatus, which are capable of stably performing image similarity determination without any determination accuracy degradation by performing the steps of: identifying a plurality of pixel regions where pixels determined to be having the same pixel values are adjacent to each other; and determining, when the number of pixels in the identified pixel regions is equal to or higher than a first threshold value, similarity among images using features calculated based on a feature point extracted from the identified pixel regions; and changing, at this time, the first threshold value when the number of the extracted feature points is equal to or lower than a second threshold value.

Another object of the present invention is to provide an image processing method, an image processing apparatus, and an image forming apparatus, which are capable of stably performing image similarity determination without any determination accuracy degradation by performing the steps of: identifying a plurality of pixel regions where pixels determined to be having the same pixel values are adjacent to each other; setting a plurality of different first threshold values when determining whether the number of pixels in the identified pixel regions is equal to or higher than the first threshold values; determining whether the number is equal to or higher than each of the first threshold values; extracting, when the number has been determined to be equal to or higher than the first threshold values, a feature point of the pixel region and counting the number of feature points for each of the plurality of the different first threshold values; and determining similarity among images using features calculated based on a feature point extracted from the pixel region having the largest number of the feature points counted.

Still another object of the present invention is to provide an image processing method, an image processing apparatus, and an image forming apparatus, which are implemented so that a document image is divided, and the lower limit value, i.e., a first threshold value, of the number of pixels in a connected region is set for each of the divided regions; thus, the threshold value can be set so that a noise in an upper and lower and right and left region of the document image is not calculated as a centroid, and in addition, the threshold value can be set so that a centroid is calculated for a smaller connected region also in an important region (e.g., a center region or the like) of the document image, thereby making it possible to secure a sufficient number of centroids with high accuracy.

Still yet another object of the present invention is to provide an image processing method, an image processing apparatus, and an image forming apparatus, which are capable of stably performing image similarity determination without any determination accuracy degradation by performing the steps of: generating a region from which a feature point is extracted; determining similarity among images using features calculated based on the feature point located within the generated region; and changing, when the number of the extracted feature points is equal to or lower than a second threshold value, the region from which the feature point is extracted.

Still another object of the present invention is to provide an image processing method, an image processing apparatus, and an image forming apparatus, in which the number of feature points is counted in a predetermined range (pixel block line) when the feature points are extracted; thus, the mask size or reference block number can be changed without reading the feature points for each process for a current feature point, thereby eliminating the necessity for performing the extraction of neighboring feature points again and again, and making it possible to facilitate and speed up the process.

Still another object of the present invention is to provide an image processing method, an image processing apparatus, and an image forming apparatus, which are capable of stably performing image similarity determination without any determination accuracy degradation by performing the steps of: identifying a plurality of pixel regions where pixels determined to be having the same pixel values are adjacent to each other; determining, when the number of pixels in the identified pixel regions is equal to or higher than a first threshold value, similarity among images using features calculated based on a feature point located within a set region among the feature points extracted from the identified pixel regions; and changing, at this time, the first threshold value, or the first threshold value and a range of the set region when the number of the extracted feature points is equal to or lower than a second threshold value.

Still yet another object of the present invention is to provide an image processing method, an image processing apparatus, and an image forming apparatus, which are capable of stably performing a process of image similarity determination without any determination accuracy degradation by performing the steps of: identifying a plurality of pixel regions where pixels determined to be having the same pixel values are adjacent to each other; setting a plurality of different first threshold values when determining whether the number of pixels in the identified pixel regions is equal to or higher than the first threshold values; determining whether the number is equal to or higher than each of the first threshold values; extracting a feature point in the pixel regions when the number has been determined to be equal to or higher than the first threshold values and counting the number of the feature points for each of the plurality of different first threshold values; and determining similarity among images using features calculated based on the feature points the number of which is the largest and which is located within a range of a set region, among the feature points extracted from the pixel region having the largest number of the feature points counted.

Still another object of the present invention is to provide an image processing method, an image processing apparatus, and an image forming apparatus, in which a region from which a feature point is extracted is defined by a pixel block including one or a plurality of pixels; thus, the region from which the feature point is extracted can be changed by changing a size of the pixel block or the number of the blocks.

An image processing apparatus according to the present invention identifies, from a binary image, a plurality of pixel regions where pixels determined to be having the same pixel values are adjacent to each other, extracts, based on a pixel coordinate value of the identified pixel region, a feature point of the pixel region, calculates features indicative of an image feature based on the extracted feature point, and determines similarity among images based on the calculated features, the image processing apparatus including: means for counting the number of the pixels in the identified pixel region; means for determining whether the number of the pixels in the identified pixel region is equal to or higher than a first threshold value; means for extracting the feature point of the pixel region and counting the number of the feature points when the number of the pixels in the identified pixel region has been determined to be equal to or higher than the first threshold value; and means for determining whether the counted number of the feature points is equal to or lower than a second threshold value, wherein the features is calculated based on the feature point extracted from the pixel region when the counted number of the feature points has been determined to be above the second threshold value, and the first threshold value is changed when the counted number of the feature points has been determined to be equal to or lower than the second threshold value.

An image processing apparatus according to the present invention identifies, from a binary image, a plurality of pixel regions where pixels determined to be having the same pixel values are adjacent to each other, extracts, based on a pixel coordinate value of the identified pixel region, a feature point of the pixel region, calculates features indicative of an image feature based on the extracted feature point, and determines similarity among images based on the calculated features, the image processing apparatus including: means for counting the number of the pixels in the identified pixel region; means for setting a plurality of different first threshold values when determining whether the number of the pixels in the identified pixel region is equal to or higher than the first threshold values, and for determining whether the number is equal to or higher than each of the first threshold values; and means for extracting the feature point of the pixel region and counting the number of the feature points for each of the plurality of different first threshold values when the number of the pixels in the identified pixel region has been determined to be equal to or higher than the first threshold values, wherein the features is calculated based on the feature point extracted from the pixel region having the largest number of the feature points counted.

An image processing apparatus according to the present invention identifies, from a binary image, a plurality of pixel regions where pixels determined to be having the same pixel values are adjacent to each other, extracts, based on a pixel coordinate value of the identified pixel region, a feature point of the pixel region, calculates features indicative of an image feature based on the extracted feature point, and determines similarity among images based on the calculated features, the image processing apparatus including: means for dividing a document image into a plurality of regions; means for setting a first threshold value for each divided region; means for counting, in each divided region, the number of the pixels of the identified pixel region; means for determining whether the number of the pixels of the identified pixel region in the divided region is equal to or higher than the first threshold value in the divided region; means for extracting feature points of the pixel region and counting the number of the feature points when the number of the pixels of the identified pixel region in the divided region has been determined to be equal to or higher than the first threshold value in the divided region; and means for determining whether the counted number of the feature points is equal to or lower than a second threshold value, wherein the features is calculated based on the feature point extracted from the pixel region when the counted number of the feature points has been determined to be above the second threshold value, and the first threshold value is changed when the counted number of the feature points has been determined to be equal to or lower than the second threshold value.

An image processing apparatus according to the present invention identifies, from a binary image, a plurality of pixel regions where pixels determined to be having the same pixel values are adjacent to each other, extracts, based on a pixel coordinate value of the identified pixel region, a feature point of the pixel region, calculates features indicative of an image feature based on the extracted feature point, and determines similarity among images based on the calculated features, the image processing apparatus including: means for deciding a neighboring feature point located within a surrounding region of the extracted feature point; means for counting the number of the decided neighboring feature points; and means for determining whether the counted number of the feature points is equal to or lower than a second threshold value, wherein the features is calculated based on the neighboring feature point when the counted number of the feature points has been determined to be above the second threshold value, and a range of the surrounding region is changed when the counted number of the feature points has been determined to be equal to or lower than the second threshold value.

An image processing apparatus according to the present invention identifies, from a binary image, a plurality of pixel regions where pixels determined to be having the same pixel values are adjacent to each other, extracts, based on a pixel coordinate value of the identified pixel region, a feature point of the pixel region, calculates features indicative of an image feature based on the extracted feature point, and determines similarity among images based on the calculated features, the image processing apparatus including: means for counting the number of the feature points within a predetermined range when extracting the feature points; means for extracting, from the counted feature points, a feature point included in a region to be processed; and means for determining whether the number of the extracted feature points is lower than a third threshold value, wherein the features is calculated based on a neighboring feature point located within a surrounding region of the extracted feature points when the number of the extracted feature points has been determined to be equal to or higher than the third threshold value, and a range of the surrounding region is changed when the number of the extracted feature points has been determined to be lower than the third threshold value.

An image processing apparatus according to the present invention identifies, from a binary image, a plurality of pixel regions where pixels determined to be having the same pixel values are adjacent to each other, extracts, based on a pixel coordinate value of the identified pixel region, a feature point of the pixel region, calculates features indicative of an image feature based on the extracted feature point, and determines similarity among images based on the calculated features, the image processing apparatus including: means for counting the number of the pixels in the identified pixel region; means for determining whether the number of the pixels in the identified pixel region is equal to or higher than a first threshold value; means for extracting the feature point of the pixel region when the number of the pixels in the identified pixel region has been determined to be equal to or higher than the first threshold value; means for deciding a neighboring feature point located within a surrounding region of the extracted feature point; means for counting the number of the decided neighboring feature points; and means for determining whether the counted number of the feature points is equal to or lower than a second threshold value, wherein the features is calculated based on the neighboring feature point when the counted number of the feature points has been determined to be above the second threshold value, and the first threshold value is changed, or the first threshold value and a range of the surrounding region are changed when the counted number of the feature points has been determined to be equal to or lower than the second threshold value.

An image processing apparatus according to the present invention identifies, from a binary image, a plurality of pixel regions where pixels determined to be having the same pixel values are adjacent to each other, extracts, based on a pixel coordinate value of the identified pixel region, a feature point of the pixel region, calculates features indicative of an image feature based on the extracted feature point, and determines similarity among images based on the calculated features, the image processing apparatus including; means for counting the number of the pixels in the identified pixel region; means for setting a plurality of different first threshold values when determining whether the number of the pixels in the identified pixel region is equal to or higher than the first threshold values, and for determining whether the number of the pixels in the identified pixel region is equal to or higher than each of the first threshold values; means for extracting the feature point of the pixel region and counting the number of the feature points for each of the plurality of different first threshold values when the number of the pixels in the identified pixel region has been determined to be equal to or higher than the first threshold values; means for extracting the feature point of the pixel region having the largest number of the feature points counted; means for deciding a neighboring feature point located within a surrounding region of the extracted feature point; means for counting the number of the decided neighboring feature points; and means for determining whether the counted number of the feature points is equal to or lower than a second threshold value, wherein the features is calculated based on the neighboring feature point when the number of the feature points counted has been determined to be above the second threshold value, and a range of the surrounding region is changed when the counted number of the feature points has been determined to be equal to or lower than the second threshold value.

In the image processing apparatus according to the present invention, the surrounding region includes a pixel block including one or a plurality of the pixels of the binary image, and the change of the range of the surrounding region is carried out by changing a size of the pixel block or the number of blocks.

An image forming apparatus according to the present invention includes: one of the foregoing image processing apparatuses; and image forming means for forming an image processed by the image processing apparatus.

A computer program according to the present invention is a control program for realizing the foregoing image processing apparatus by a computer.

In a computer-readable memory product according to the present invention, the foregoing computer program is recorded.

In the present invention, when the number of the feature points is equal to or lower than the second threshold value, the first threshold value is changed to increase the feature points extracted from the pixel regions, thereby making it possible to perform adjustment so that the number of the feature points for features calculation will not be extremely small, and to stabilize the similarity determination accuracy without degrading it.

In the present invention, the feature points are extracted from the identified pixel region based on the plurality of different first threshold values, and the features is calculated based on the feature point whose number is the largest among the extracted feature points, thereby making it possible to perform adjustment so that the number of the feature points will not be extremely small, and to stabilize the similarity determination accuracy without degrading it.

The present invention is implemented so that a document image is divided, and the lower limit value for the number of pixels in a connected region, i.e., the first threshold value, is set for each of the divided regions; thus, the threshold value can be set so that a noise in an upper and lower and right and left region of the document image is not calculated as a centroid, and in addition, the threshold value can be set so that a centroid is calculated for a smaller connected region also in an important region (e.g., a center region or the like) of the document image, thereby making it possible to secure a sufficient number of centroids with high accuracy.

In the present invention, the number of feature points is counted in a predetermined range (pixel block line) when the feature points are extracted; thus, the mask size or the number of reference blocks can be changed without reading the feature points for each process for a current feature point, thereby eliminating the necessity for performing the extraction of neighboring feature points again and again, and making it possible to facilitate and speed up the process.

In the present invention, an image processing method that utilizes a centroid of a pixel region within an image, which serves as an image similarity determination method unsusceptible to disturbance, can be stably executed without any degradation in similarity determination accuracy. It should be noted that this process is performed when performing a process of storing an image and a process of matching an inputted image with the stored image. When the image is stored, this operation may be performed by selecting a storing mode from an operation panel of a digital copier (or a multifunction peripheral), for example. When this operation is realized by software, a screen for setting an operation of a scanner may be displayed on a display, for example, and a storing mode may be selected using a mouse and/or a keyboard.

The above and further objects and features of the invention will more fully be apparent from the following detailed description with accompanying drawings.

BRIEF DESCRIPTION OF THE SEVERAL VIEWS OF THE DRAWINGS

FIG. 16 is an explanatory diagram showing a structure of a threshold value table;

FIG. 17 is an explanatory diagram showing a structure of a threshold value table;

FIG. 28 is an explanatory diagram showing the relationship between the number of pixel blocks in a surrounding region and neighboring feature points located within the surrounding region;

FIG. 34 is an explanatory diagram showing the relationship between current feature points and neighboring feature points;

FIGS. 36A to 36C are explanatory diagrams each showing an example of invariant calculation using the current feature point;

FIGS. 37A and 37B are explanatory diagrams each showing a structure of a hash table;

FIGS. 39A to 39D are explanatory diagrams each showing an example of invariant calculation using the current feature point.

DETAILED DESCRIPTION OF THE INVENTION

Figure 1:
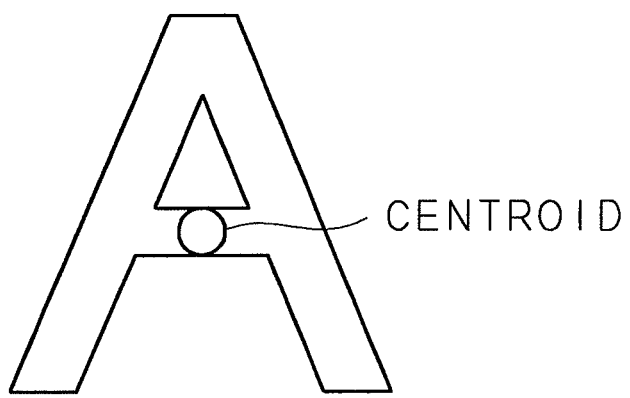
FIG. 1 is an explanatory diagram showing a centroid of a connected component.
Figure 2:
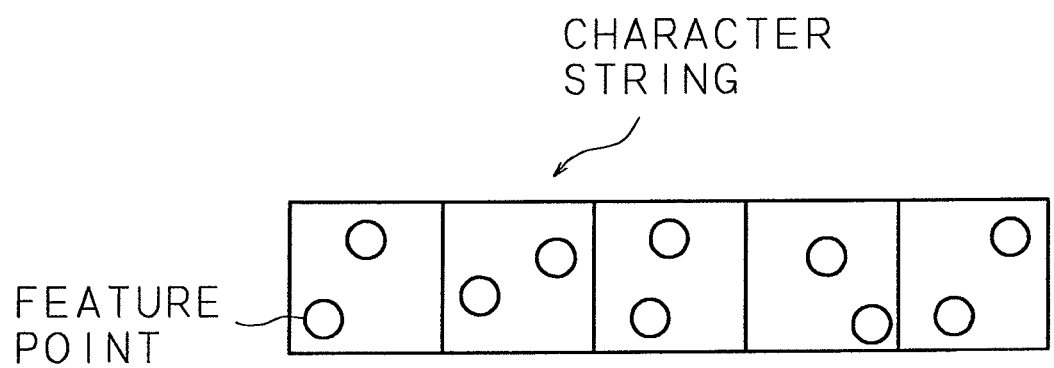
FIG. 2 is an explanatory diagram showing an example in which a centroid serves as a feature point.
Figure 3:
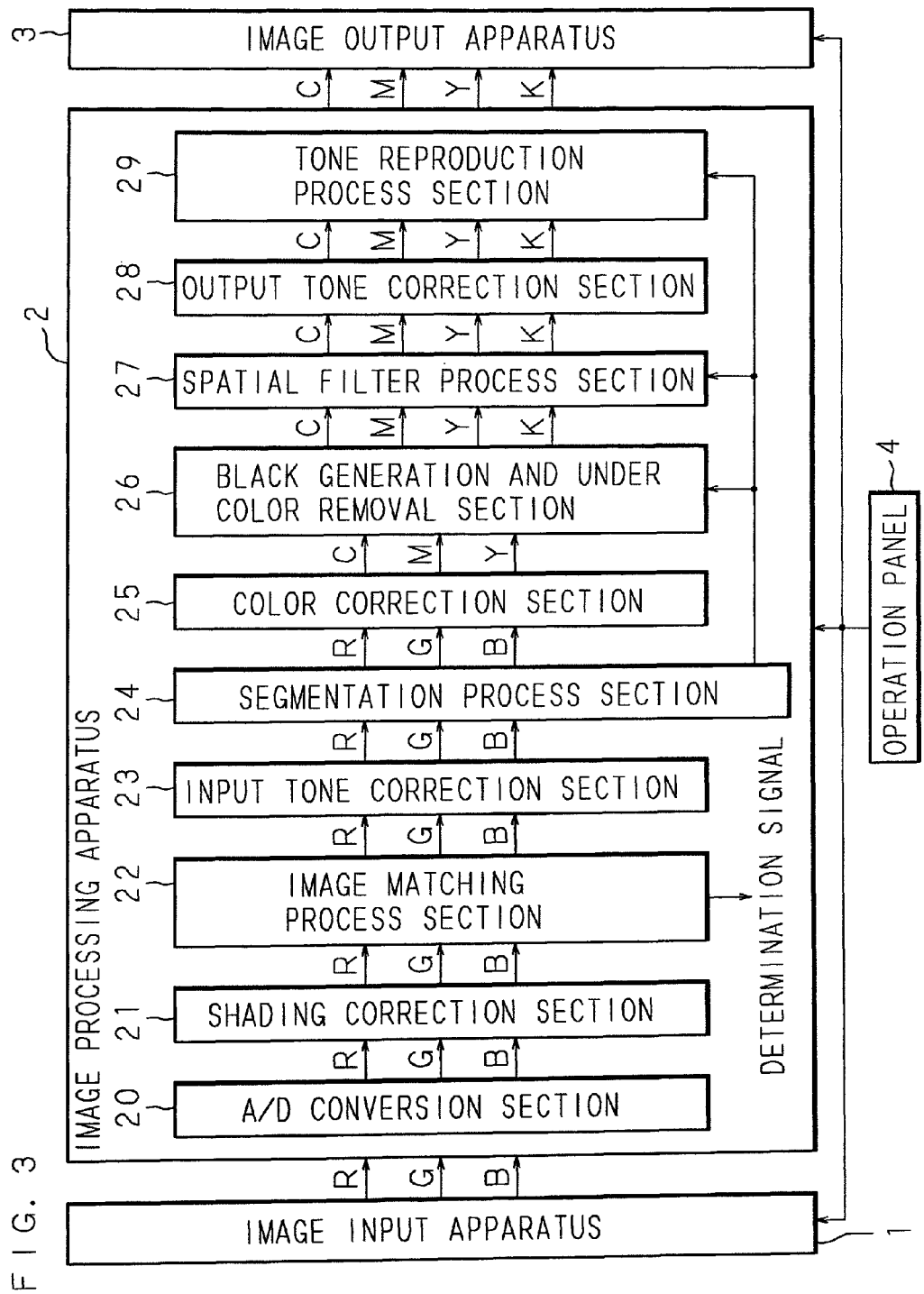
FIG. 3 is a schematic diagram showing an overall configuration of an image forming apparatus including an image processing apparatus according to the present invention.

Hereinafter, the present invention will be described with reference to the drawings illustrating embodiments thereof. FIG. 3 is a schematic diagram showing an overall configuration of an image forming apparatus including an image processing apparatus 2 according to the present invention. Subordinate examples will be described below in each section of the description as deemed appropriate while the principal embodiments will be described.

The image forming apparatus in the diagram is a digital copier, a multifunction peripheral (MFP) or the like, for example, and includes: an image input apparatus 1; an image processing apparatus 2; an image output apparatus 3; and an operation panel 4. The image input apparatus 1, which is, for example, a scanner provided with a CCD (Charged Coupled Device), receives a reflected light from a document in the form of RGB analog signals, and outputs them to the image processing apparatus 2. The image processing apparatus 2 performs after-mentioned processes on the received RGB analog signals, and outputs them to the image output apparatus 3 as CMYK digital color signals. The image output apparatus 3, which is, for example, a color image output apparatus employing, an electrophotography method or an inkjet method, receives the CMYK digital color signals outputted from the image processing apparatus 2, and outputs a color image onto a surface of a recording medium such as a paper based on the received digital color signals.

The image processing apparatus 2 includes: an A/D conversion section 20; a shading correction section 21; an image matching process section 22; an input tone correction section 23; a segmentation process section 24; a color correction section 25; a black generation and under color removal section 26; a spatial filter process section 27; an output tone correction section 28; and a tone reproduction process section 29.

The A/D conversion section 20 converts the RGB analog signals, received from the image input apparatus 1, into digital signals, and outputs the converted digital signals to the shading correction section 21. The shading correction section 21 receives the digital signals outputted from the A/D conversion section 20, and performs, on the received digital signals, a process of removing various kinds of distortions generated in the illumination system, the image focusing system, and the image sensing system of the image input apparatus 1. Furthermore, the shading correction section 21 converts the signals into ones (density signals) most suitable for the process in the image processing apparatus 2 while performing a process of adjusting color balance, and outputs the processed digital signals to the image matching process section 22.

The image matching process section 22 corresponds to the image processing apparatus according to the present invention, which binarizes an image based on the received image digital signals, identifies, from the binary image, a pixel region (connected component) where pixels having the same values are continuous, extracts a feature point of the pixel region based on the coordinate values of the pixels of the identified pixel region, calculates features (feature vectors) indicative of the image feature based on the extracted feature point, determines similarity among images based on the calculated features, and outputs the determination result, indicative of the similarity determination result, to an after-mentioned memory 225. An after-mentioned control section 226, which is a CPU or an MPU, performs a predetermined process in accordance with the determination result. For example, when received the determination result indicative of the fact that the images are similar, the control section 226 performs a process of abandoning output of the image, inhibiting copying of the image, or storing (filing) the image in a predetermined folder. It should be noted that, in the present embodiment, "images" are defined as an image received via the image input apparatus 1 for determination this time, and the other document image received via the image input apparatus 1 and stored in an after-mentioned hash table in advance, but the present invention is not limited to this definition. Furthermore, the image matching process section 22 outputs the digital signals, received from the shading correction section 21, to the input tone correction section 23 without making any modification thereto, while performing the above-described processes.

The input tone correction section 23 receives the digital signals outputted from the image matching process section 22, performs page background density removal or an image quality tone process such as contrast on the received digital signals, and outputs the processed digital signals to the segmentation process section 24. The segmentation process section 24 receives the digital signals outputted from the input tone correction section 23, and divides the image into any of a text component, a halftone segment, and a photograph (continuous tone) component based on the received digital signals. Based on the division result, the segmentation process section 24 generates a segment identification signal indicating that the image belongs to which segment, i.e., a text segment, a halftone segment or a photograph segment, and outputs the generated segment identification signal to the black generation and under color removal section 26, the spatial filter process section 27 and the tone reproduction process section 29, while outputting the digital signals, received from the input tone correction section 23, to the color correction section 25.

The color correction section 25 receives the digital signals, outputted from the segmentation process section 24, to perform, on the received digital signals, a process of removing color impurity based on the spectral characteristics of the CMY color materials containing unnecessary absorption components, and outputs the processed digital signals to the black generation and under color removal section 26. The black generation and under color removal section 26 receives the digital signals (CMY) outputted from the color correction section 25, generates a black signal (K) from the received digital signals, generates new digital signals (CMY) obtained by subtracting the generated black signal from the digital signals, and respectively outputs the generated new digital signals (CMY) and black signal (K) to the spatial filter process section 27.

The spatial filter process section 27 receives the digital signals (CMYK) outputted from the black generation and under color removal section 26, performs, based on the segment identification signal received from the segmentation process section 24, a spatial filtering process on the received digital signals to correct spatial frequency characteristics, and outputs the processed digital signals to the output tone correction section 28. Due to such a process, blur occurrence or graininess degradation of the image to be outputted can be reduced.

The tone reproduction process section 29 receives the digital signals outputted from the spatial filter process section 27, performs the following processes on the received digital signals, stores the processed digital signals (CMYK) in a storage device (not shown), and reads the signals at a predetermined timing to output them to the image output apparatus 3. For a pixel which belongs to a text component from the image based on the segmentation class signal received from the segmentation process section 24, the spatial filter process section 27 emphasizes a high frequency component of a text region by a digital filter. Due to such a process, text reproducibility can be improved. The tone reproduction process section 29 performs a binary process or multi-level dithering process for the image by a high-resolution screen most suitable for the reproduction of the high frequency component. In addition, for a pixel which belongs to a halftone component from the image based on the segmentation class signal, the spatial filter process section 27 removes an input halftone component from a halftone region using a low-pass filter. Besides, for a pixel which belongs to a photograph component from the image based on the segmentation class signal, the tone reproduction process section 29 performs a binary process or multi-level dithering process on a photograph region by a screen in which tone reproducibility is emphasized.

Figure 4:
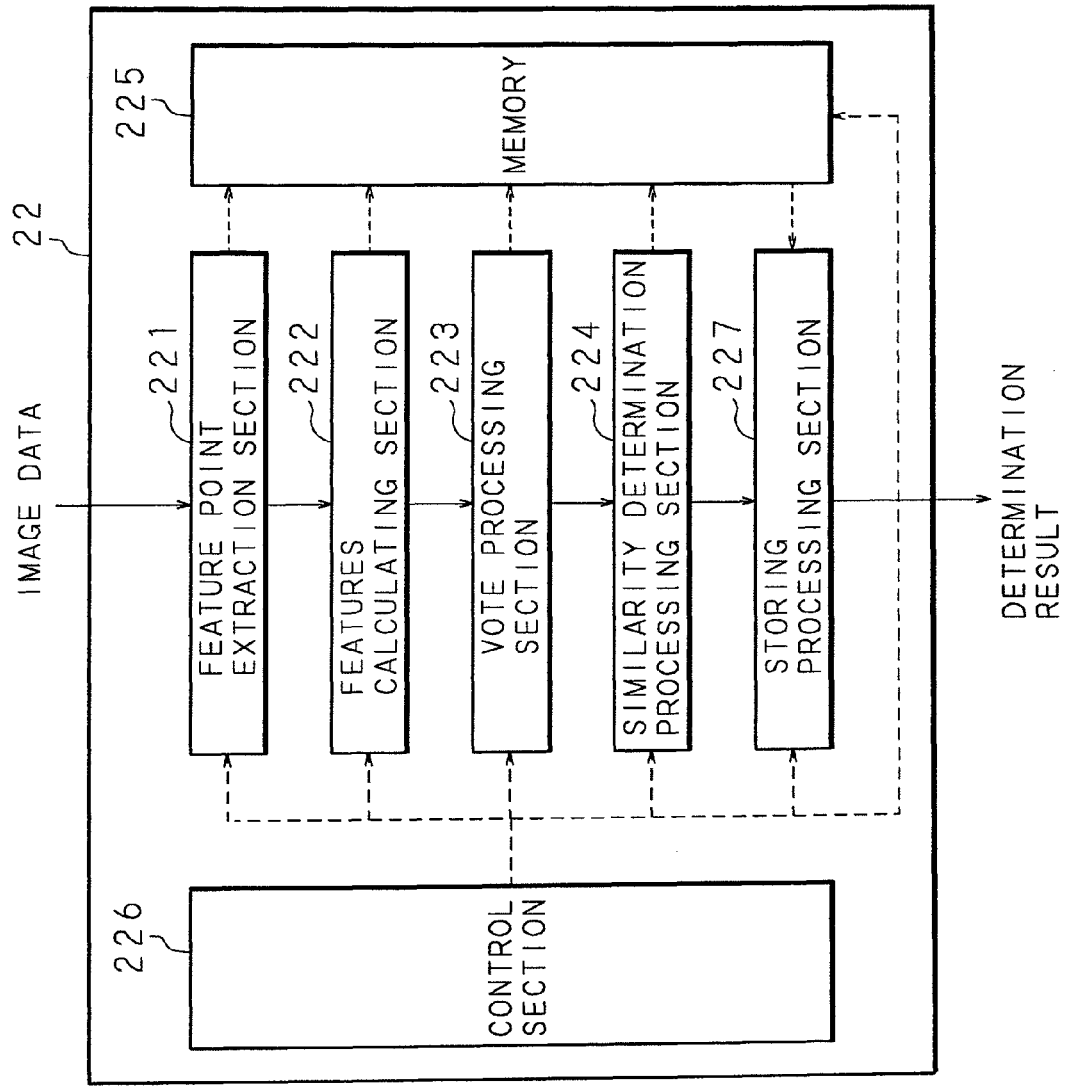
FIG. 4 is a schematic diagram showing an overall configuration of an image matching process section.

Next, the image matching process section 22 will be described. FIG. 4 is a schematic diagram showing an overall configuration of the image matching process section 22. The image matching process section 22 includes: a feature point extraction section 221; a features calculating section 222; a vote processing section 223; a similarity determination processing section 224; a memory 225; a control section 226; and a storing processing section 227.

The feature point extraction section 221 identifies, from the received binary image data, a plurality of connected components where pixels having the same values are continuous, extracts feature points of the connected components based on the coordinate values of the pixels of the identified connected components, and outputs the extracted feature points to the features calculating section 222. It should be noted that the configuration and processing procedure of the feature point extraction section 221 will be described later. The features calculating section 222 calculates features indicative of the image feature based on the feature points extracted by the feature point extraction section 221. It should be noted that the configuration and processing procedure of the features calculating section 222 will be described later.

Based on the feature (hash value) calculated by the features calculating section 222, the vote processing section 223 searches a hash table stored in the memory 225, votes for the image indicated by the index stored in the hash table, and outputs the accumulatively added voting results to the similarity determination processing section 224. The similarity determination processing section 224 receives the results outputted from the vote processing section 223, determines image similarity based on the received results, and outputs the determination result of this determination via the storing processing section 227. At this time, the process in the storing processing section 227 is passed through (i.e., no process is performed). It should be noted that the specific processing procedure will be described later.

In the memory 225, the data created by the processes executed by the image matching process section 22, the after-mentioned hash table and the like are stored. The control section 226 carries out control so that each piece of hardware provided in the image matching process section 22 realizes a series of processes. The storing processing section 227 sequentially stores features (hash values) calculated by the features calculating section 222, and indices (document ID) indicating documents (reference images) in the hash table stored in the memory 225 (see FIG. 37A). If a hash value has already been stored, a document ID is stored in association with this hash value.

Figure 5:
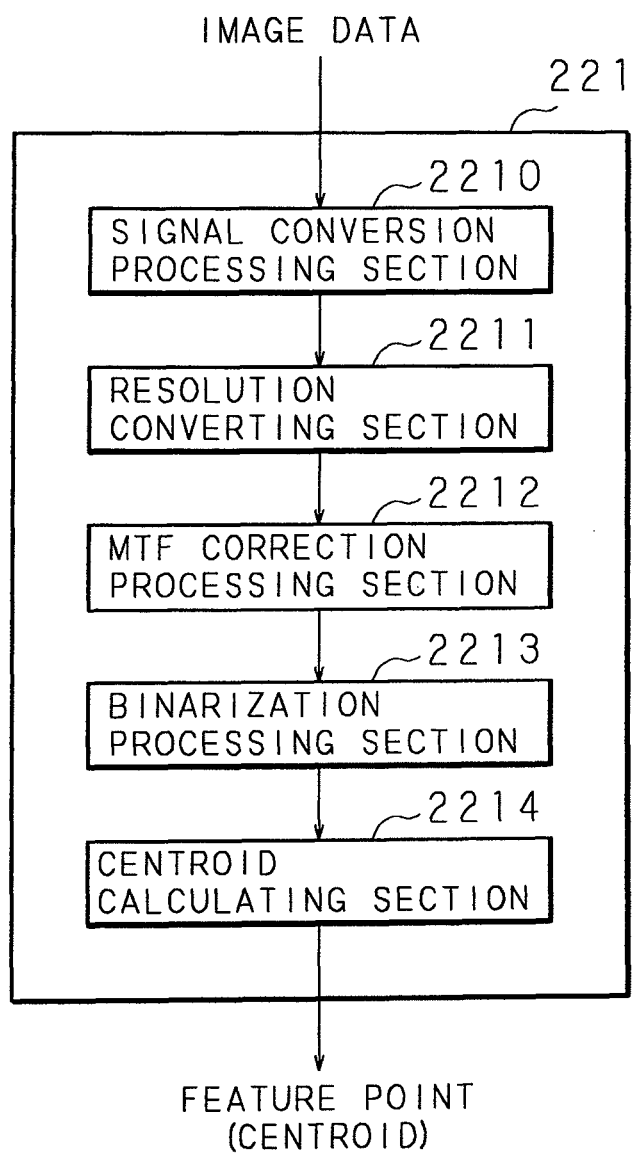
FIG. 5 is a schematic diagram showing a configuration of a feature point extraction section.

Next, the feature point extraction section 221 of the image matching process section 22 will be described. FIG. 5 is a schematic diagram showing a configuration of the feature point extraction section 221. The feature point extraction section 221 includes: a signal conversion processing section 2210; a resolution converting section 2211; an MTF correction processing section 2212; a binarization processing section 2213; and a centroid calculating section 2214.

When the received image data is a color image, the signal conversion processing section 2210 performs a process of achromatizing this image data to convert it into a lightness or luminance signal. For example, the signal conversion processing section 2210 computes the following equation; $Yj=0.30Rj+0.59Gj+0.11Bj$, and carries out achromatization using the computation result. It is to be noted that $Yj$ represents a luminance value of each pixel, and $Rj$, $Gj$, and $Bj$ each represent a color component of each pixel. It should be noted that the RGB signals may be converted into CIE1976 $L^*a^*b^*$ signals. It is to be noted that CIE represents "Commission International de l'Eclairage", $L^*$ represents lightness, and $a^*b^*$ represents chromaticity. When the received image data has undergone optical magnification change in the image input apparatus 1, the resolution converting section 2211 performs a magnification change process again so as to realize a predetermined resolution. It should be noted that if this image data has not undergone optical magnification change, the resolution converting section 2211 converts the image data into one having a low resolution and suppresses the capacity to be processed, thus making it possible to relieve the process.

The MTF correction processing section 2212 performs a suitable filter process on the image data having different spatial frequency characteristics for each model and received from the image input apparatus 1, thereby remedying blurs caused by degradation based on the spatial frequency characteristic of this image data. Further, the MTF correction processing section 2212 performs enhancement and smoothing processes using a mixed filter so as to suppress unnecessary high frequency components. The binarization processing section 2213 performs a process of converting the achromatized image data, which has been received, or the image data, which has been achromatized in the signal conversion processing section 2210, into binary image data suitable for after-mentioned centroid calculation. For example, the binarization processing section 2213 calculates the average value of pixel values of the image, and performs a process of binarizing each pixel of this image using the calculated average value as a threshold value.

Figure 6:
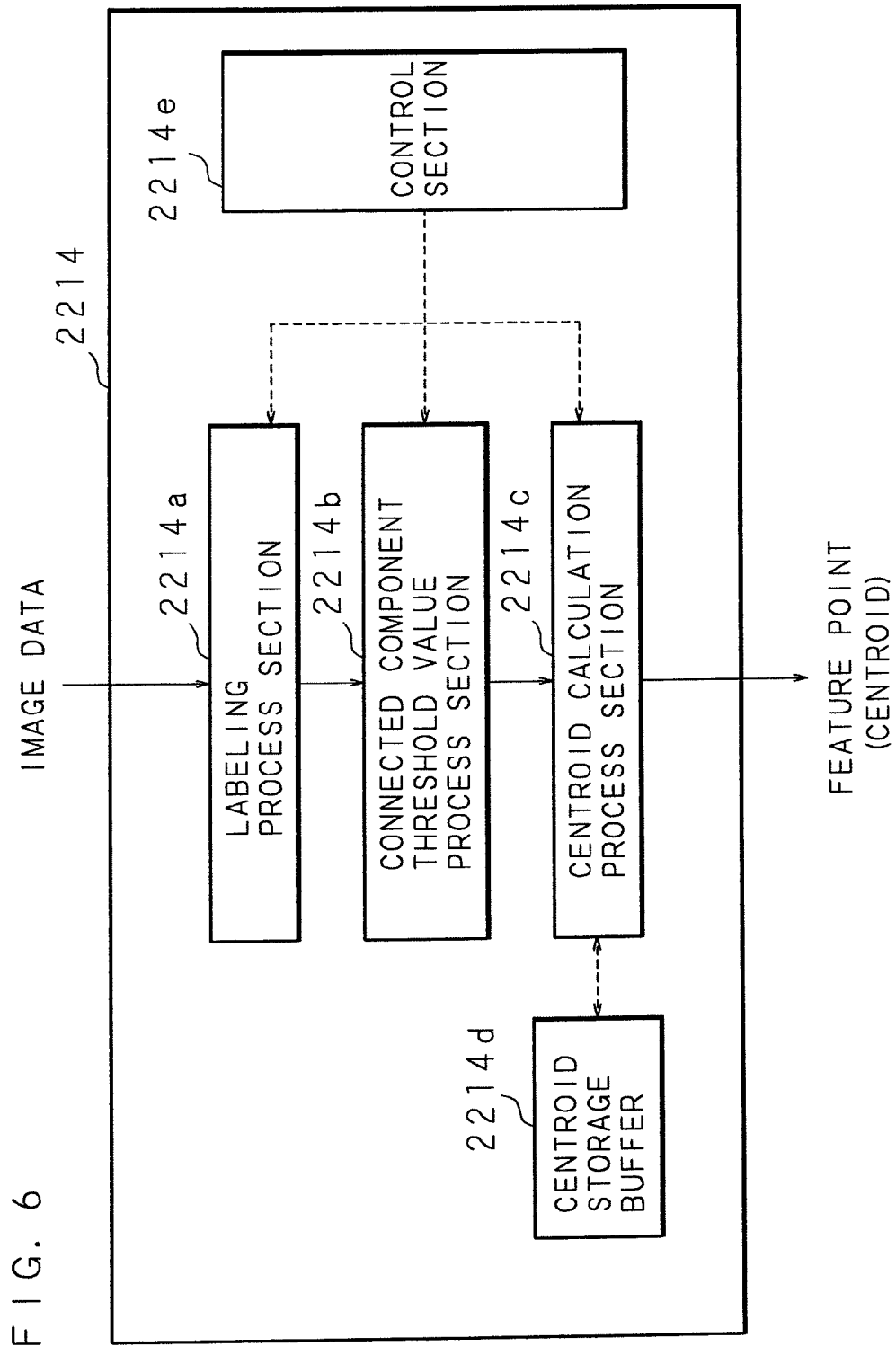
FIG. 6 is a schematic diagram showing a configuration of a centroid calculating section.

By performing the after-mentioned processes, the centroid calculating section 2214 obtains, from the binary image data in the binarization processing section 2213, a centroid of a connected component in which pixels having the same values are continuous, and outputs this centroid to the memory 225 as a feature point. FIG. 6 is a schematic diagram showing a configuration of the centroid calculating section 2214. The centroid calculating section 2214 includes: a labeling process section 2214a; a connected component threshold value process section 2214b; a centroid calculation process section 2214c; a centroid storage buffer 2214d; and a control section 2214e.

The labeling process section 2214a identifies a connected component from the image, and sequentially performs labeling on the pixels of the identified connected component. The control section 2214e accumulatively adds the coordinate values of the labeled pixels, and stores the addition result in the centroid storage buffer 2214d. The centroid storage buffer 2214d stores the x-coordinate addition result, the y-coordinate addition result, the number of addition for each label (i.e., the number of labeled pixels), and flags used for determination.

When an untargeted label exists after the accumulative addition has been ended for one line of the image, i.e., when there is no continuation with the pixel of the next line, the control section 2214e ends the accumulative addition process. Further, the control section 2214e changes a first threshold value. The connected component threshold value process section 2214b performs after-mentioned centroid calculation determination based on the addition result stored in the centroid storage buffer 2214d. When the centroid calculation determination has been performed in the connected component threshold value process section 2214b, the centroid calculation process section 2214c performs centroid calculation based on the addition result stored in the centroid storage buffer 2214d, and outputs the calculated centroid to the memory 225 as a feature point.

Figure 7:
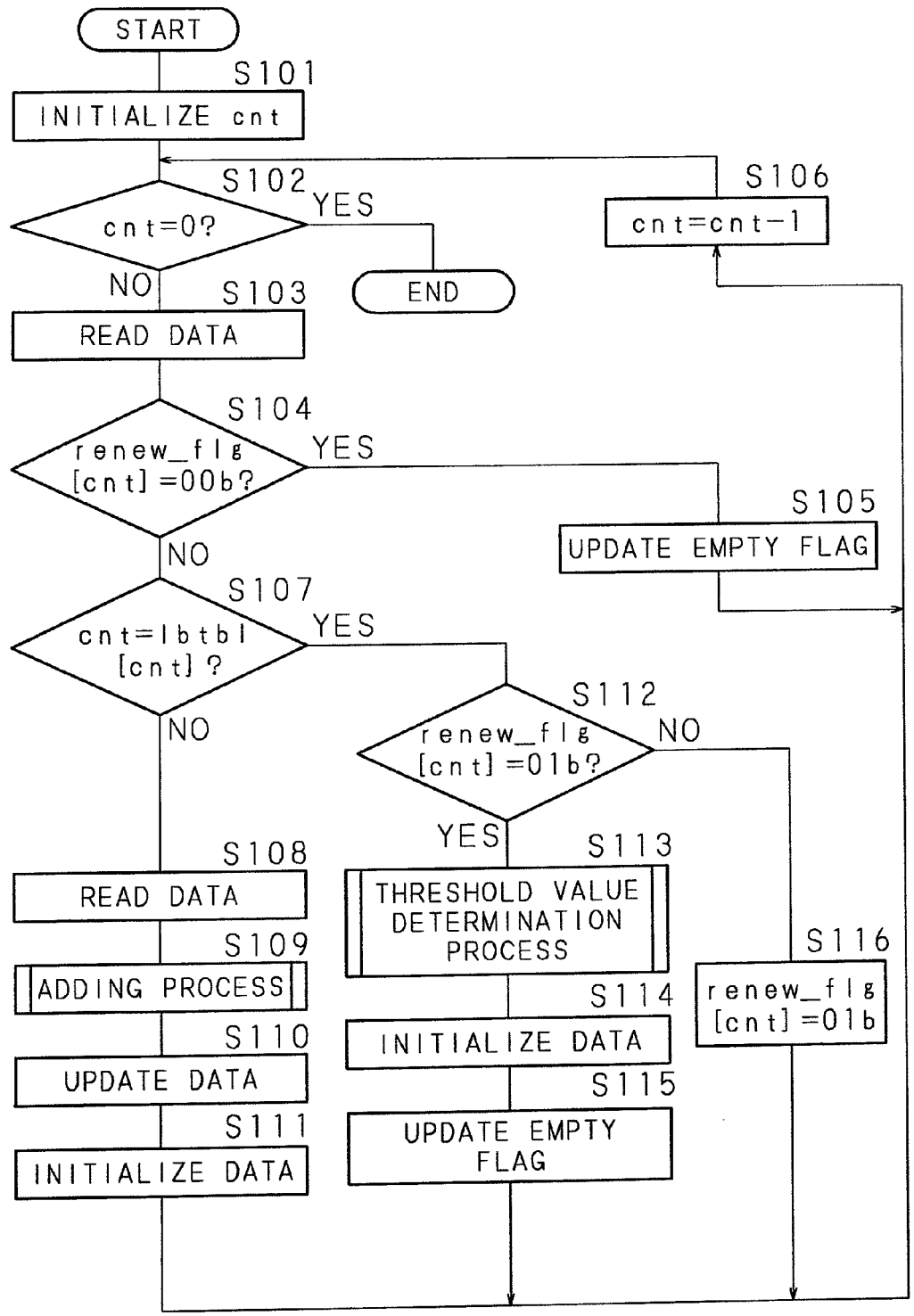
FIG. 7 is a flow chart showing a procedure of a centroid calculating process of the centroid calculating section.

Next, a procedure of a centroid calculating process performed by the centroid calculating section 2214 of the feature point calculation section 221. FIG. 7 is a flow chart showing a procedure of a centroid calculating process of the centroid calculating section 2214. It should be noted that variables shown in the chart respectively correspond to the x-coordinate addition result, the y-coordinate addition result, the number of addition for each label (i.e., the number of labeled pixels), and flags used for determination.

"cnt" is an internal counter indicating the maximum value of label assignment to connected components, and if 2047 labels are assigned at the maximum, for example, "cnt" is represented by 11 bit (0 to 2047). In other words, if "cnt"=11, it signifies that the number of the identified connected components is at least 11. Further, "renew_flg" is a flag of a 2 bit signal indicative of whether the label is updated, which is represented as being "00b" when the label information is empty, represented as being "01b" when the label information is not updated, and represented as being "10b" when the label information is updated. For example, "renew_flg [cnt]" is an updated flag when the data in which a "cnt" value serves as an address has been read from the centroid storage buffer 2214d, and "renew_flg [5]" signifies an updated flag of the data to be stored at Address 5.

"lbnum" indicates the number of pixels for the label, and the "lbnum" value of the label is incremented by 1 every time labeling is performed. For example, "lbnum [cnt]" signifies the number of pixels for a label when the data in which the "cnt" value serves as an address has been read from the centroid storage buffer 2214d. Thus, the number of pixels of a connected component can be counted.

"sumx" indicates a total sum obtained by adding the x-coordinates of pixels of the label, and the x-coordinate of the current pixel at the present time is added to the "sumx" value of the label every time labeling is performed. For example, "sumx [cnt]" signifies an x-coordinate sum when the data in which the "cnt" value serves as an address has been read from the centroid storage buffer 2214d. Further, "sumy" indicates a total sum obtained by adding the y-coordinates of pixels of the label, and the y-coordinate of the current pixel at the present time is added to the "sumy" value of the label every time labeling is performed. For example, "sumy [cnt]" signifies a y-coordinate sum when the data in which the "cnt" value serves as an address has been read from the centroid storage buffer 2214d.

"lbtbl" indicates label information when a label table has been read, and "lbtbl [cnt]" signifies label information when a label table in which the "cnt" value serves as an address has been read from the centroid storage buffer 2214d.

When the process is started, the centroid calculating section 2214 initializes "cnt" in the labeling process section 2214a (S101), determines whether the "cnt" at the present time is 0 (S102), and ends the process when "cnt" is 0 (when the answer is YES in S102). It should be noted that an initial value is equal to the number of the identified connected components, and falls within 2047 which is the maximum number of labels or the maximum value of "cnt".

On the other hand, when it is determined that "cnt" is not 0 in the labeling process section 2214a (when the answer is NO in S102), the centroid calculating section 2214 reads, from the centroid storage buffer 2214d, data in which the "cnt" value at the present time serves as an address (S103), and determines whether "renew_flg [cnt]" included in the read data is "00b" (S104). In other words, the centroid calculating section 2214 determines whether the label information is empty. As a result, when it is determined that "renew_flg [cnt]" is "00b" in the labeling process section 2214a (when the answer is YES in S104), the centroid calculating section 2214 updates an empty flag indicating that the label has become empty (S105), and decrements "cnt" at the present time (S106), thus returning the procedure to the determination at Step S102.

On the other hand, when it is determined that "renew_flg [cnt]" is not "00b" in the labeling process section 2214a (when the answer is NO in S104), the centroid calculating section 2214 further determines whether "lbtbl [cnt]" is equal to the "cnt" value at the present time (S107), and reads, when it is determined that "lbtbl [cnt]" is not equal to the "cnt" value at the present time (when the answer is NO in S107), data in which the "lbtbl [cnt]" value serves as an address from the centroid storage buffer 2214d (S108).

The centroid calculating section 2214 performs an after-mentioned adding process on the data read by the labeling process section 2214a (S109), and updates, based on the result of the adding process, the data in which the "lbtbl [cnt]" value serves as an address (S110). The centroid calculating section 2214 initializes the data read using the "cnt" value as an address in the labeling process section 2214a (S111), decrements "cnt" at the present time (S106), and returns the procedure to the determination at Step S102.

On the other hand, when it is determined that "lbtbl [cnt]" is equal to the "cnt" value at the present time in the labeling process section 2214a (when the answer is YES in S107), the centroid calculating section 2214 further determines whether "renew_flg [cnt]" is "01b" (S112). In other words, it is determined whether the label information is updated. As a result, when it is determined that "renew_flg [cnt]" is "01b" in the labeling process section 2214a (when the answer is YES in S112), the centroid calculating section 2214 executes an after-mentioned threshold value determination process (S113), initializes the data read using the "cnt" value as an address (S114), updates an empty flag indicating that the label has become empty (S115), decrements "cnt" at the present time (S106), and returns the procedure to the determination at Step S102.

On the other hand, when it is determined that "renew_flg [cnt]" is not "01b" in the labeling process section 2214a (when the answer is NO in S112), the centroid calculating section 2214 updates "renew_flg [c]" to "01b" (S116), i.e., indicates the fact that the label information has been reset without update, decrements "cnt" at the present time (S106), and returns the procedure to the determination in Step S102.

Figure 8:
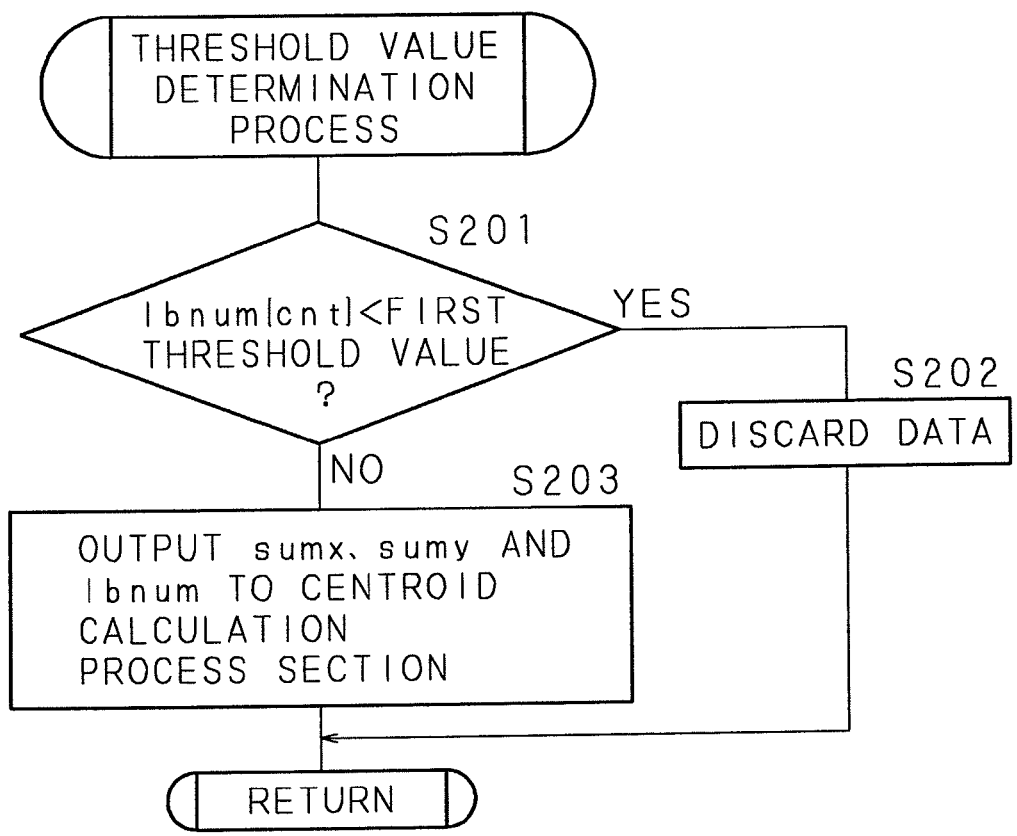
FIG. 8 is a flow chart showing a procedure of threshold value determination in the centroid calculating section.

Next, the procedure of threshold value determination executed by the centroid calculating section 2214 in Step S113 of the above-described centroid calculating process will be described. The centroid calculating section 2214 counts the number "lbnum" of pixels of the target label, determines whether the number "lbnum" of pixels of the target label counted is equal to or higher than the first threshold value, and decides, in accordance with the determination result, whether centroid calculation is performed in the centroid calculation process section 2214c. FIG. 8 is a flow chart showing a procedure of threshold value determination in the centroid calculating section 2214.

The centroid calculating section 2214 reads the "cnt" value as an address by the connected component threshold value process section 2214b, determines whether "lbnum [cnt]", which is the number of pixels of the target label counted, is lower than the first threshold value (S201), discards the data including "lbnum [cnt]" (S202) when it is determined that "lbnum [cnt]" is lower than the first threshold value (when the answer is YES in S201), and changes the first threshold value as described later, thus ending the threshold value determination. On the other hand, when it is determined that "lbnum [cnt]" is equal to or higher than the first threshold value in the connected component threshold value process section 2214b (when the answer is NO in S201), the centroid calculating section 2214 outputs "sumx", "sumy" and "lbnum" included in the read data to the centroid calculation process section 2214c (S203), thus ending the threshold value determination.

Figure 9:
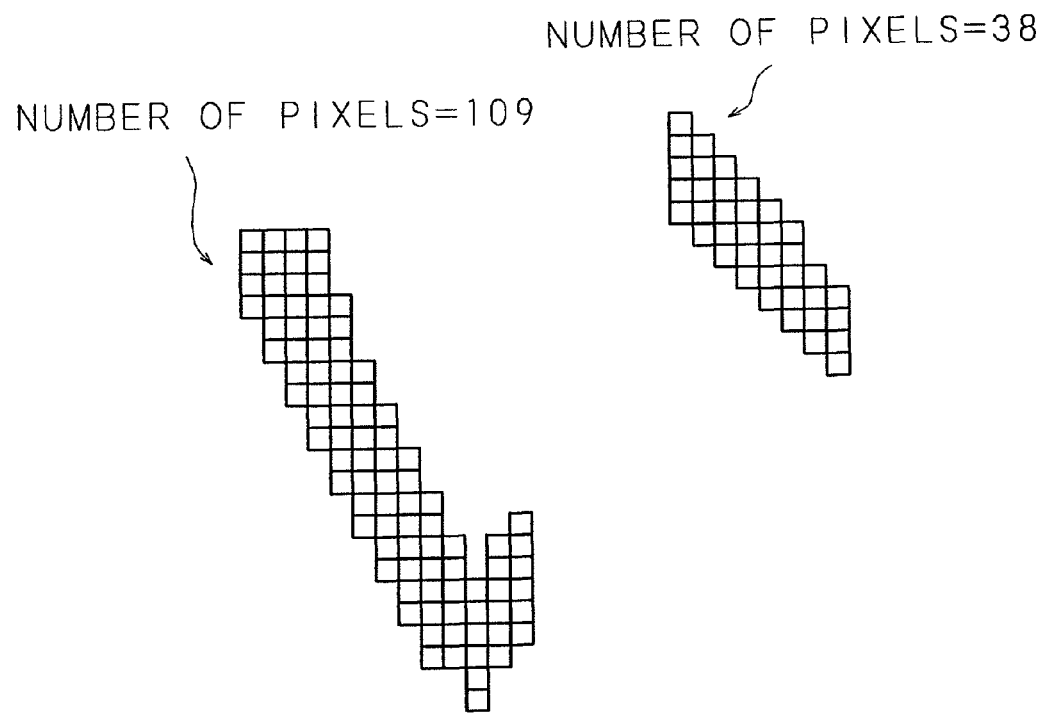
FIG. 9 is an explanatory diagram showing an example of the threshold value determination.
Figure 10:
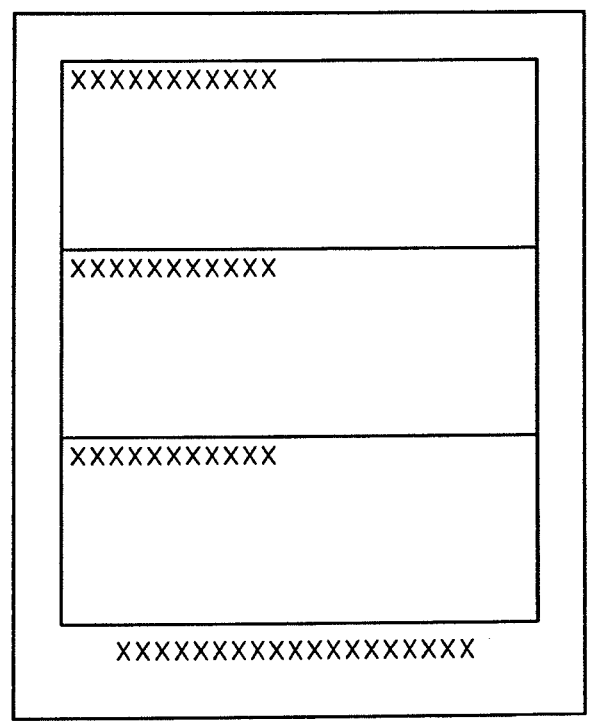
FIG. 10 is an explanatory diagram showing an example of a document having a small number of feature points.

Now, a specific example of threshold value determination will be described. FIG. 9 is an explanatory diagram showing an example of the threshold value determination, and FIG. 10 is an explanatory diagram showing an example of a document having a small number of feature points. For example, when the first threshold value is set to be 100, the left-hand side one of the connected components of labels of characters in FIG. 9 becomes the target for centroid calculation since the number of pixels thereof is 109; however, the right-hand side connected component does not become the target for centroid calculation since the number of pixels thereof is 38, and the obtained result will be discarded. Accordingly, when the document including the characters in FIG. 9 includes a ruled line frame and a small number of characters (see FIG. 10), the number of pixels of the connected component is small, the target for centroid calculation is reduced, and the necessary number of feature points cannot be secured, resulting in degradation in determination accuracy. To cope with this, the centroid calculating section 2214 changes the first threshold value to 30, for example. As a result, the right-hand side connected component becomes the centroid target, and the number of feature points is increased, thereby making it possible to avoid the degradation in determination accuracy.

Figure 11:
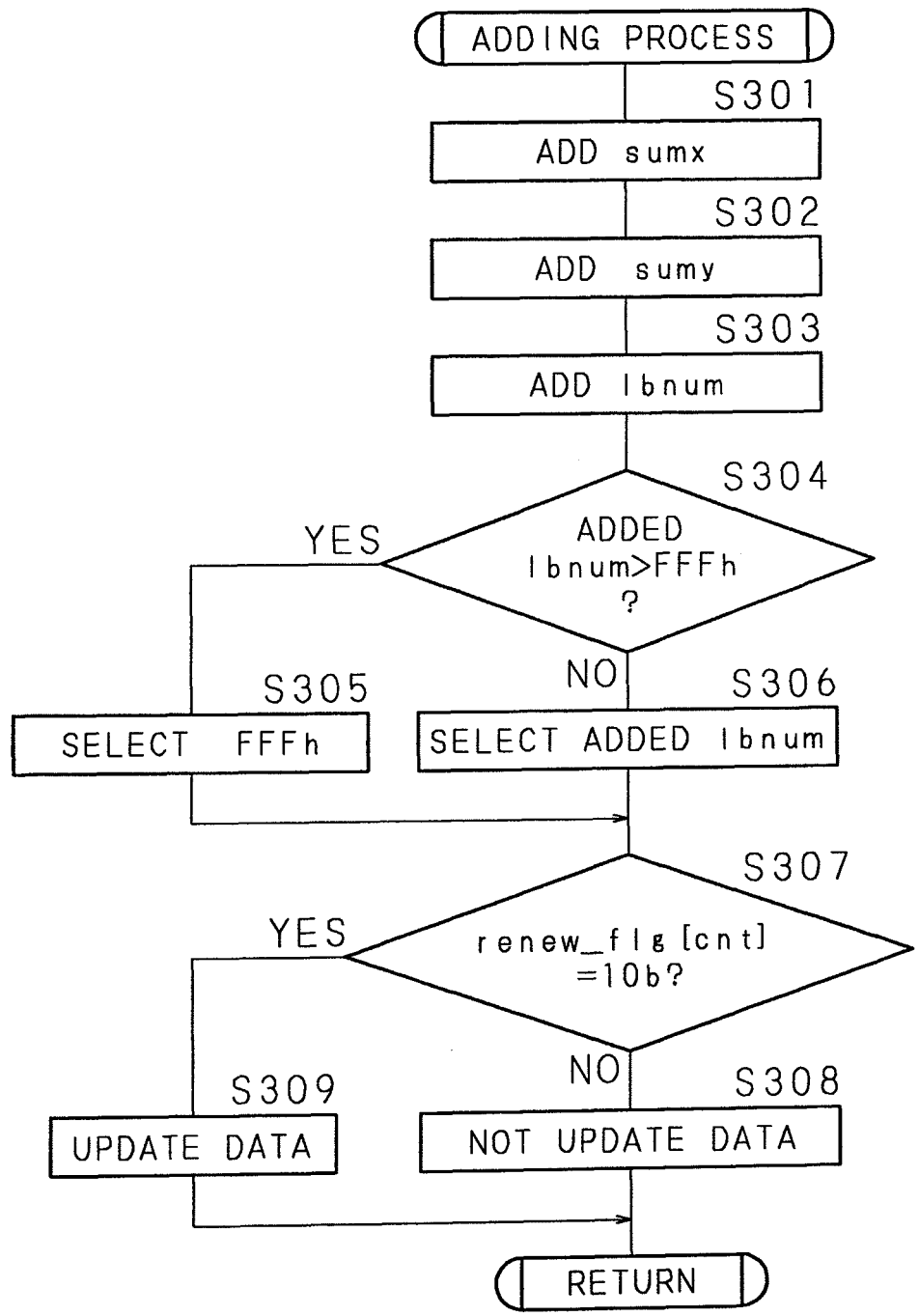
FIG. 11 is a flow chart showing a procedure of an adding process of the centroid calculating section.

Next, the procedure of the adding process, executed by the centroid calculating section 2214 in Step S109 of the above-described centroid calculating process, will be described. The centroid calculating section 2214 accumulatively adds the pixel coordinate value of a connected component of a label, counts the number of pixels used for the accumulative addition, and outputs these results to the centroid calculation process section 2214c. FIG. 11 is a flow chart showing a procedure of the adding process of the centroid calculating section 2214.

The centroid calculating section 2214 adds "sumx", included in the data read by the control section 2214e from the centroid storage buffer 2214d using the "cnt" value as an address, to "sumx" included in the data read from the buffer using the "lbtbl [cnt]" value as an address (S301), and adds "sumy", included in the data read from the buffer using the "cnt" value as an address, to "sumy" included in the data read from the buffer using the "lbtbl [cnt]" value as an address (S302). The centroid calculating section 2214 adds "lbnum", included in the data read by the control section 2214e from the buffer using the "cnt" value as an address, to "lbnum" included in the data read from the buffer using the "lbtbl [cnt]" value as an address (S303), and determines whether the added "lbnum" exceeds "FFFh" which is the maximum value (S304). As a result, when it is determined that the added "lbnum" exceeds "FFFh" in the control section 2214e (when the answer is YES in S304), the centroid calculating section 2214 selects "FFFh" (S305), and clips the selected "FFFh".

On the other hand, when it is determined that the added "lbnum" does not exceed "FFFh" in the control section 2214e (when the answer is NO in S304), the centroid calculating section 2214 selects the added "lbnum" (S306), and clips the selected added "lbnum".

Then, the centroid calculating section 2214 determines whether "renew_flg [cnt]" is "10b" in the control section 2214e (S307), and updates, when it is determined that "renew_flg [cnt]" is "10b" (when the answer is YES in S307), "renew_flg [lbtbl [cnt]]" included in the data read from the centroid storage buffer 2214d using the "lbtbl [cnt]" value as an address to "10b" (S309), thus ending the adding process.

On the other hand, when it is determined that "renew_flg [cnt]" is not "10b" in the control section 2214e (when the answer is NO in S307), the centroid calculating section 2214 ends the adding process without updating "renew_flg [lbtbl [cnt]]" (S308).

After the adding process has been ended, the centroid calculating section 2214 updates the data, read by the control section 2214e using the "lbtbl [cnt]" value as an address, to the added "sumx", "sumy" and the clipped and added "lbnum" or "FFFh" (see Step S110).

It should be noted that, in the present embodiment, the centroid calculating section 2214 performs threshold value determination based on one first threshold value, but the present invention is not limited to this; alternatively, the threshold value determination may be concurrently performed based on a plurality of different first threshold values, the first threshold value by which the number of connected components becomes the largest may be determined as a result of the determination, and the above-described centroid calculating process, threshold value determination and adding process may be executed based on the determined first threshold value. Hereinafter, this alternative will be described as Example 1.

EXAMPLE 1

Figure 12:
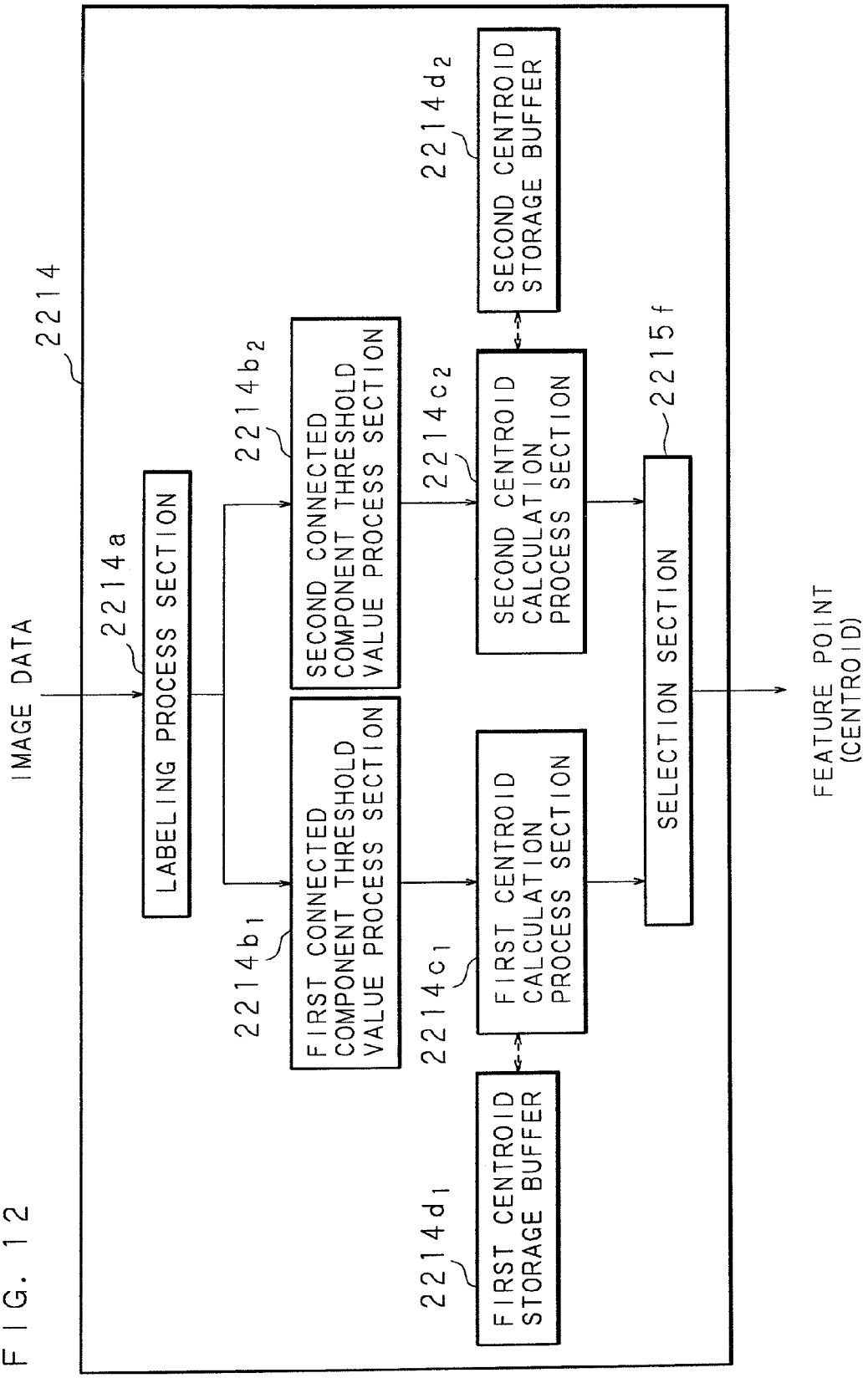
FIG. 12 is a schematic diagram showing a configuration of a centroid calculating section according to Example 1.

FIG. 12 is a schematic diagram showing a configuration of a centroid calculating section 2214 according to Example 1. In Example 1, a connected component threshold value process section 2214b includes: a first connected component threshold value process section $2214b_1$; and a second connected component threshold value process section $2214b_2$, a centroid calculation process section 2214c includes: a first centroid calculation process section $2214c_1$; and a second centroid calculation process section $2214c_2$, and a centroid storage buffer 2214d includes: a first centroid storage buffer $2214d_1$; and a second centroid storage buffer $2214d_2$. The centroid calculating section 2214 according to the other example performs threshold value determination based on different first threshold values, i.e., a first connected component threshold value and a second connected component threshold value (for example, 30 and 100), respectively performs centroid calculation based on the determination results, selects the result by which the centroids (feature points) becomes the largest in a selection section 2215*f*, and outputs the selected feature points to the memory 225. Thus, Example 1 has been described.

Further, in the present embodiment, an example in which the lower limit value, i.e., the first threshold value, is changed without dividing a document image has been described, but the present invention is not limited to this; alternatively, the document image may be divided, and the first threshold value may be changed for each of the divided regions. Hereinafter, this alternative will be described as Example 2.

EXAMPLE 2

Figure 13:
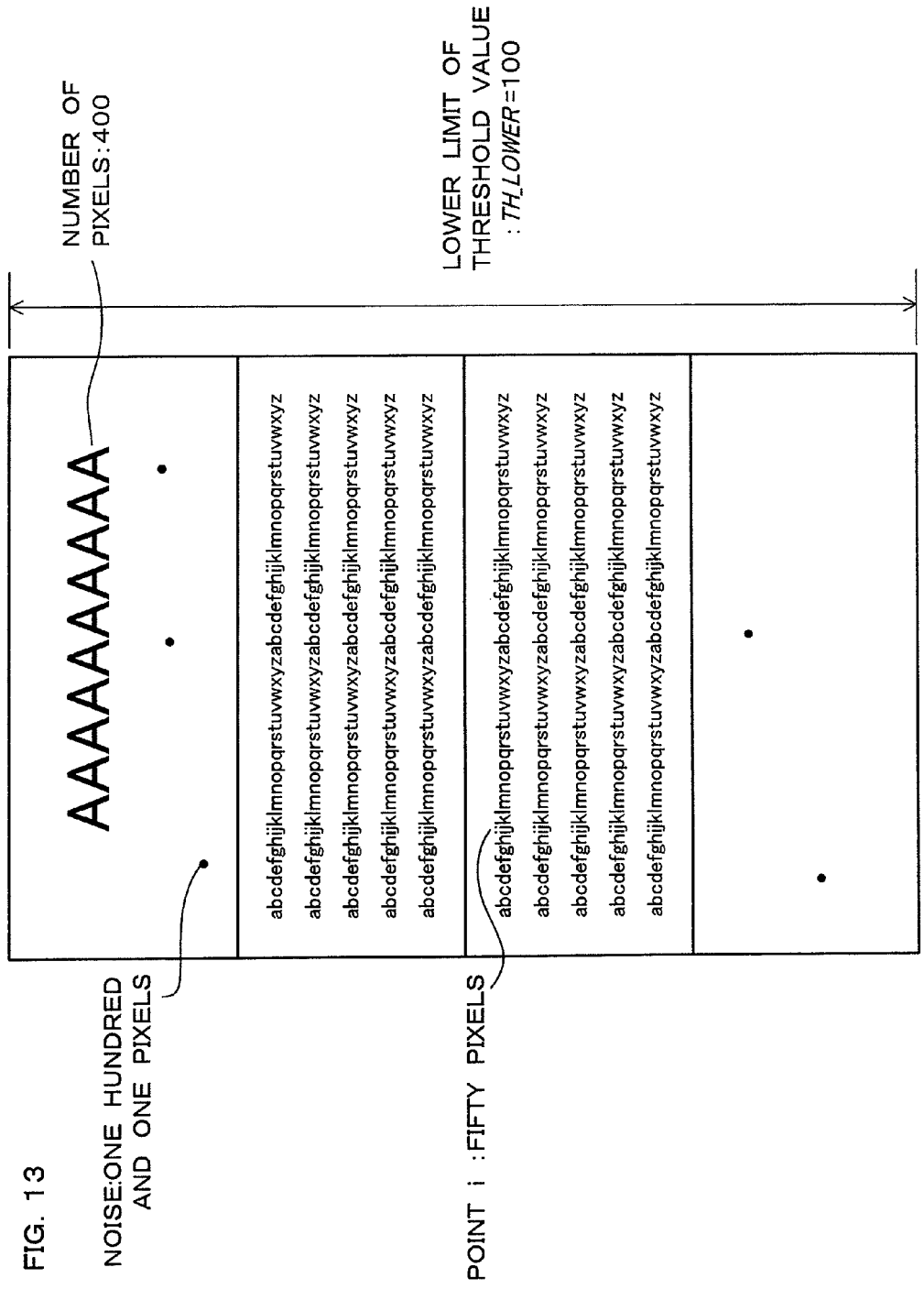
FIG. 13 is an explanatory diagram showing an example of a document image to be inputted.

FIG. 13 is an explanatory diagram showing an example of a document image to be inputted. Generally, the format of a document to be inputted varies widely; however, characters rarely exist uniformly across the entire document, and characters often do not exist in an upper and lower and right and left region of the document. For example, when the lower limit of threshold value determination is uniformly set to be 100 as shown in FIG. 13, a noise falls within the range of the threshold value determination and thus becomes the target for centroid calculation. Further, when the number of pixels of a connected component of the character existing in a center region of the document image (for example, the number of pixels at a point i) is 100 or less, it does not become the target for centroid calculation. Thus, the accuracy of the centroid to be calculated might be degraded.

To cope with this, Example 2 is implemented so that the document image is divided, and the lower limit value is set for each of the divided regions; thus, it is possible to set the threshold values which prevent the noise in the upper and lower and right and left region from being calculated as a centroid, and in addition, it is possible to set the threshold values so as to perform centroid calculation for a smaller connected region also in the important region of the document image (e.g., the center region or the like), thereby making it possible to set flexible threshold values with the aim of comprehensively improving the accuracy. In other words, it is possible to remove the noise, and to calculate a centroid for a small connected component of a character portion, thereby making it possible to secure a sufficient number of centroids with high accuracy.

Figure 14:
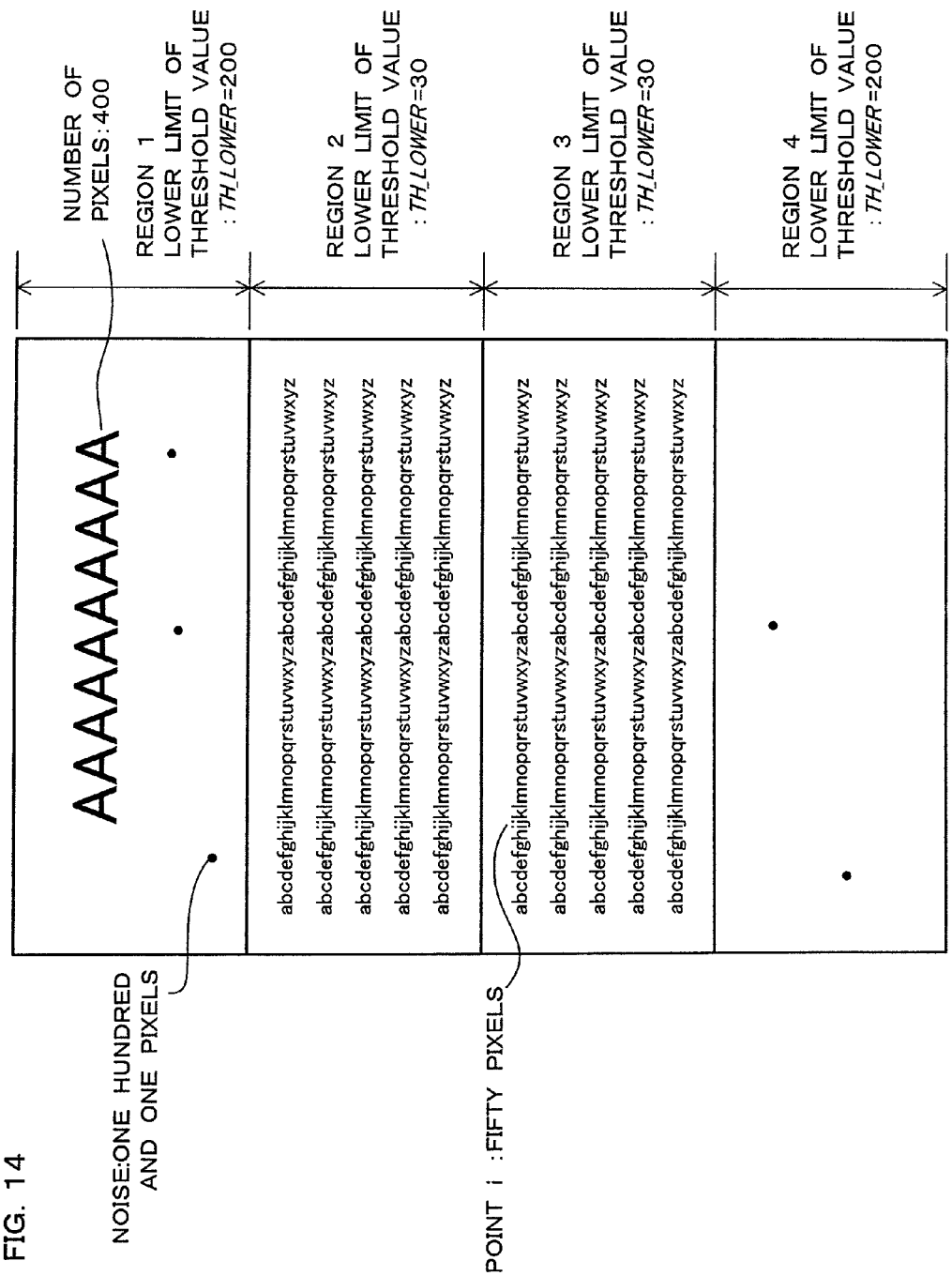
FIG. 14 is an explanatory diagram showing an example in which a document image is equally divided into four portions.
Figure 15:
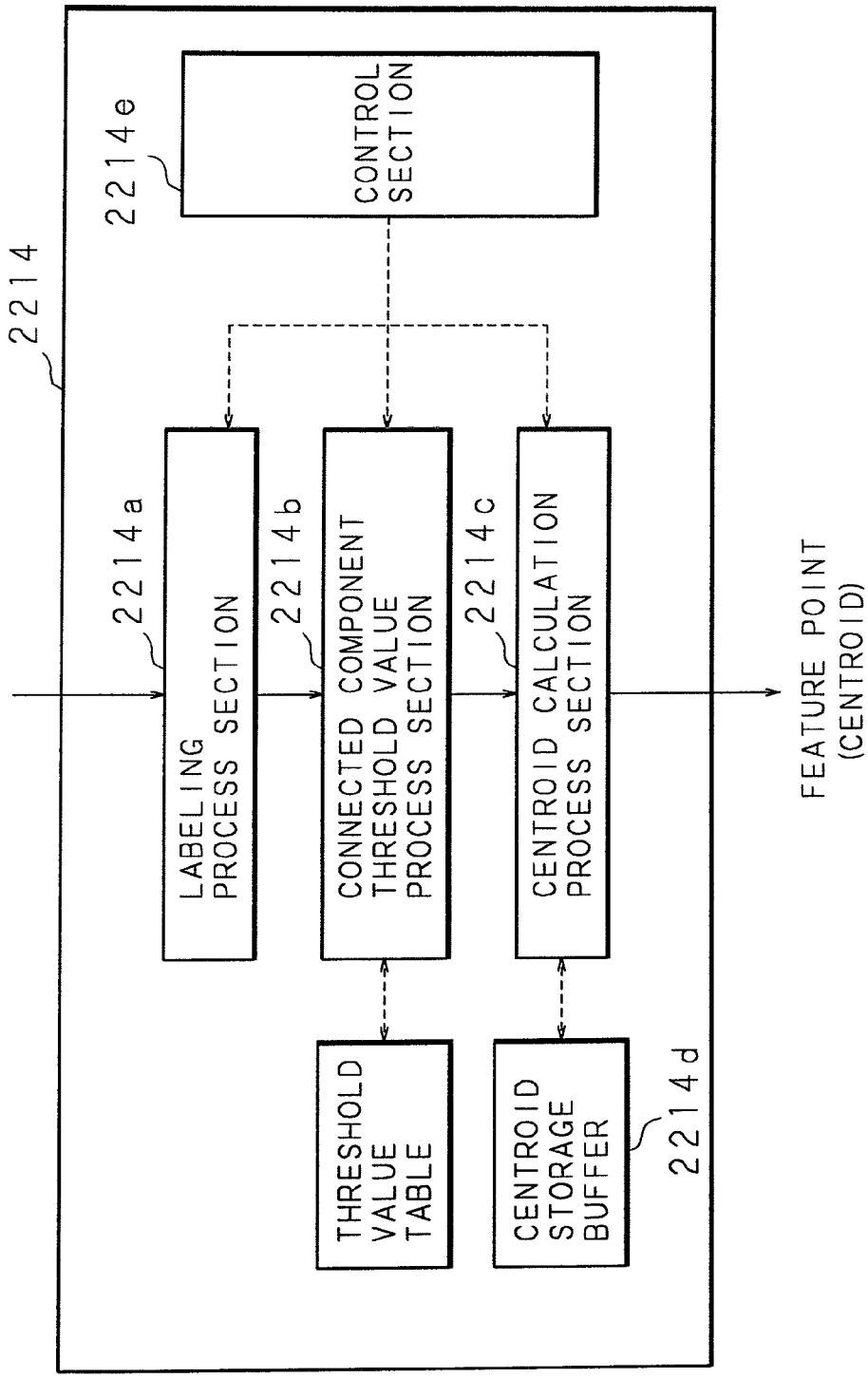
FIG. 15 is a schematic diagram showing a configuration of a centroid calculating section according to Example 2.
Figure 18:
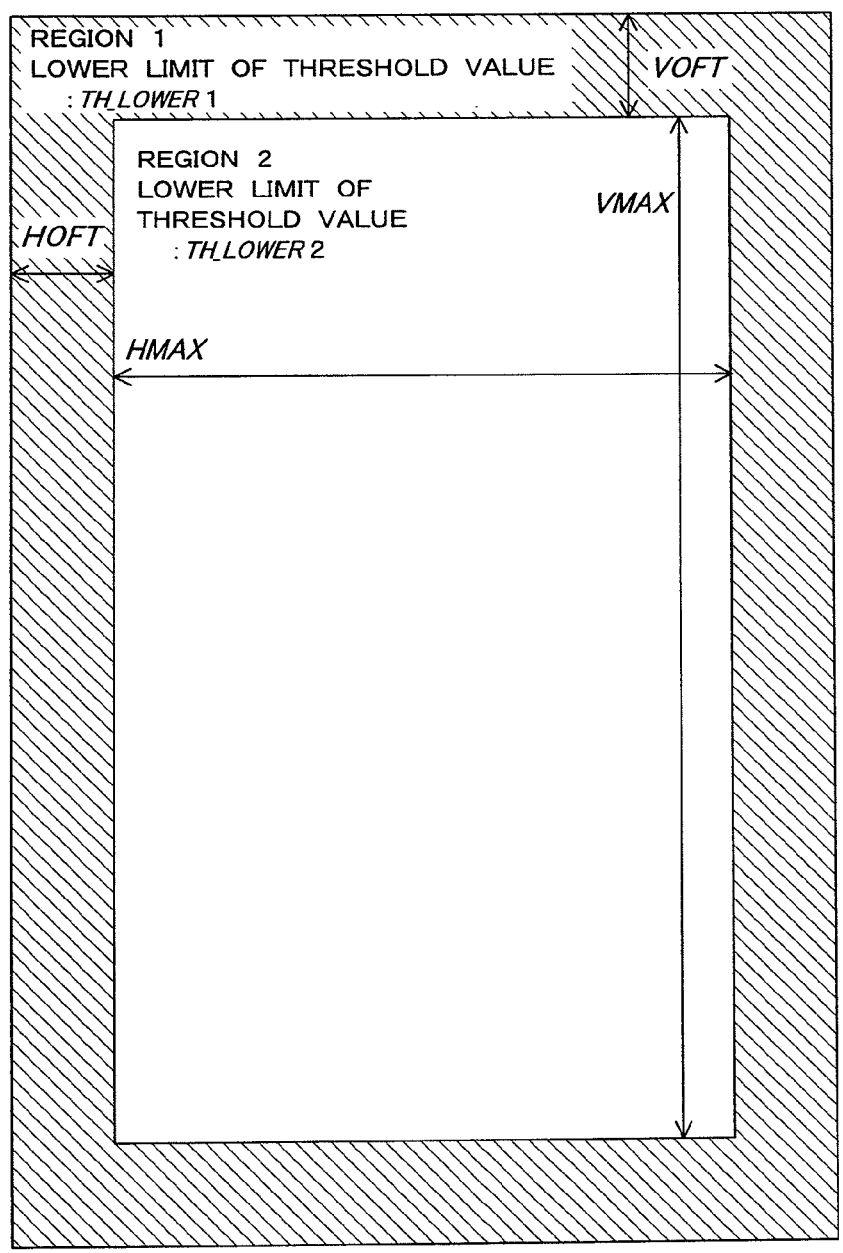
FIG. 18 is an explanatory diagram showing an example in which a document image is divided.

FIG. 14 is an explanatory diagram showing an example in which a document image is equally divided into four portions, FIG. 15 is a schematic diagram showing a configuration of a centroid calculating section 2214 according to Example 2, FIG. 16 and FIG. 17 are explanatory diagrams each showing a structure of a threshold value table, and FIG. 18 is an explanatory diagram showing an example in which a document image is divided.

In FIG. 14, from an upper end region, a region 1, a region 2, a region 3, and a region 4 are defined in this order. Further, in Example 2, the lower limit threshold value of the region 1 is set to be 200, the lower limit threshold value of the region 2 is set to be 30, the lower limit threshold value of the region 3 is set to be 30, and the lower limit threshold value of the region 4 is set to be 200. By providing such a configuration, in the region 1, only characters "A" whose number of pixels is 400 become the centroid calculation target, and noises do not become the target. In the region 2 and the region 3, the character connected component whose number of pixels is small, such as a point i, also becomes the centroid calculation target. In the region 4, only noises exist, but these noises do not become the centroid calculation target.

Thus, in the method of Example 2, the centroid calculation can be accurately performed. Furthermore, in this method, it is unnecessary to execute the procedure for performing threshold value determination concurrently and for deciding the range from the determination result, thereby facilitating and rapidly performing the process.

The centroid calculating section 2214 includes a threshold value table (see FIG. 15). The threshold value table may store lower limit threshold values with which addresses and region numbers are associated as shown in FIG. 16, or the threshold value table may be formed so as to store the respective lower limit threshold values with which addresses and the division numbers of the regions of the document image are associated as shown in FIG. 17. It should be noted that the other configuration of the centroid calculating section 2214 is similar to that of the centroid calculating section 2214 shown in FIG. 6; therefore, the same reference characters are assigned thereto, and the description thereof will be omitted.

As for the division number of the document image, the division number may be decided by collecting statistics from various document images. In the other method, the division number may be decided utilizing document image type, or layout recognition result.

As for the division number of the document image, the document image does not have to be divided equally in accordance with the division number as shown in FIG. 14, but the line number may be set for each region, or the calculation may be performed automatically from set weights; for example, a weighting factor may be set for the calculation. Furthermore, instead of dividing the image only in one of a main scanning direction and a sub-scanning direction, an alternative configuration may be employed as follows: the document image is divided into a right and left and upper and lower end region and a center region by setting offsets (HOFT, and VOFT) and the numbers of pixels (HMAX, and VMAX) in the main scanning direction and the sub-scanning direction as shown in FIG. 18, thus setting mutually different lower limit threshold values. It should be noted that in the example of FIG. 18, the division number is 2.

It should be noted that if the above-described document image is divided and the number of feature points calculated by setting the lower limit value of a connected region in each divided region is equal to or lower than a second threshold value, the range (mask size, and the number of reference blocks) of a surrounding region from which features is obtained may be changed. Thus, Example 2 has been described.

Figure 19:
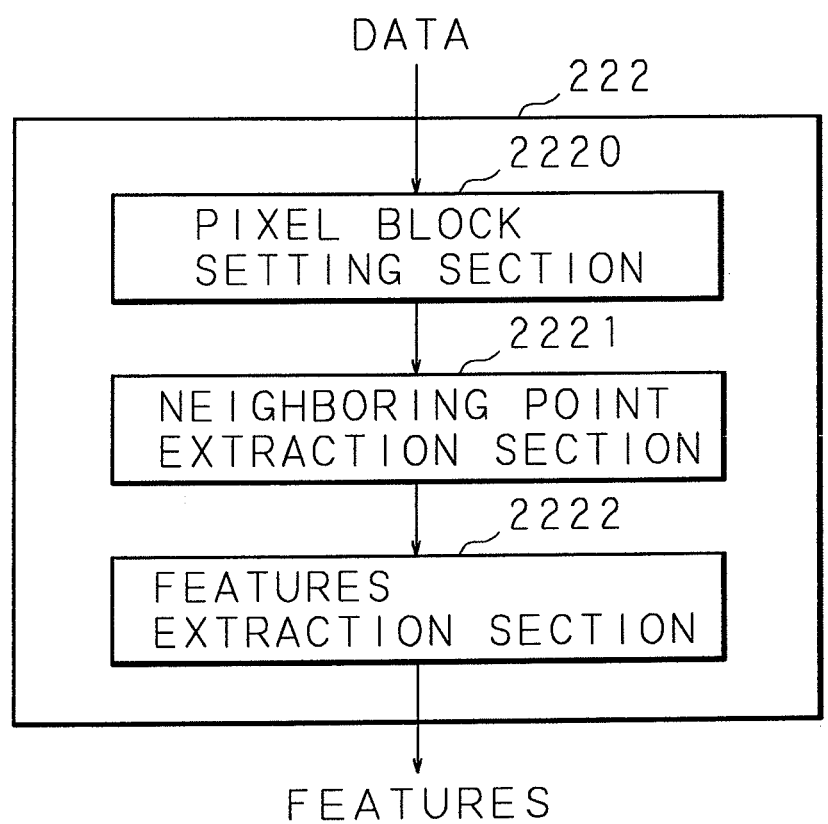
FIG. 19 is a schematic diagram showing a configuration of a features calculating section.
Figure 20:
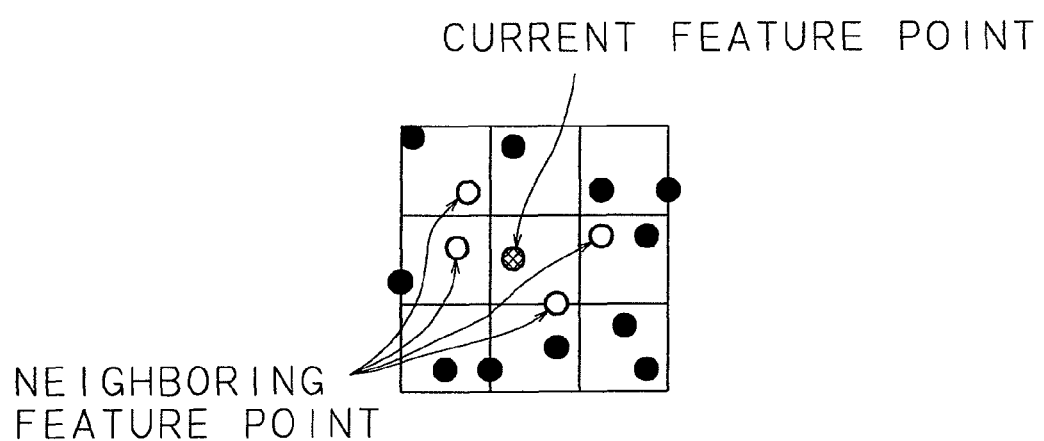
FIG. 20 is an explanatory diagram showing a surrounding region of a current feature point.

Next, the features calculating section 222 of the image matching process section 22 will be described. FIG. 19 is a schematic diagram showing a configuration of the features calculating section 222, and FIG. 20 is an explanatory diagram showing a surrounding region of a current feature point. The features calculating section 222 includes: a pixel block setting section 2220; a neighboring point extraction section 2221; and a features extraction section 2222.

The pixel block setting section 2220 determines one of the extracted feature points as a current feature point, sets a pixel block including one or a plurality of pixels of an image so as to indicate a surrounding region of the current feature point, and performs a process of changing the mask size of the set pixel block or the number of reference blocks so as to change the surrounding region.

The neighboring point extraction section 2221 decides, among the extracted feature points, a neighboring feature point located within the surrounding region, counts the number of the decided neighboring feature points, and performs a process of determining whether the counted number is equal to or lower than the second threshold value. When the counted number has been determined to be above the second threshold value as a result of the determination, the features extraction section 2222 performs a features calculation process. It should be noted that if there exist a large number of neighboring feature points located within the surrounding region, four feature points whose distances from the current feature point are the shortest may be decided as the neighboring feature points (see FIG. 20).

The features extraction section 2222 performs a process of calculating features indicative of the image feature based on the current feature point and/or decided neighboring feature points, and outputs the calculated features to the memory 225. It should be noted that the features calculating method will be described later.

Figure 21A:
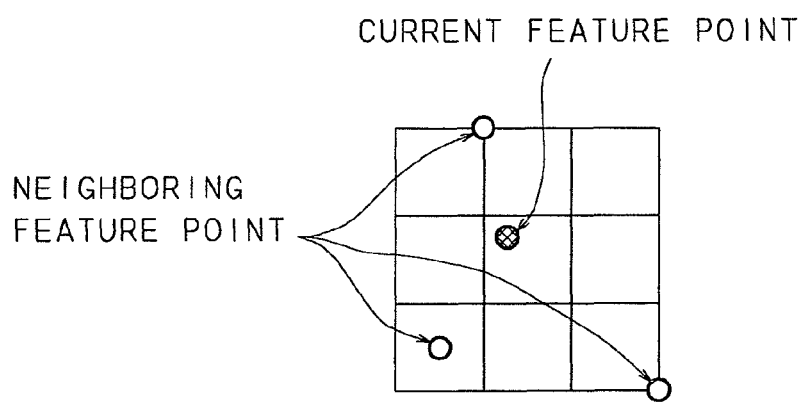
FIGS. 21A and 21B are explanatory diagrams each showing the relationship between a mask size of a surrounding region and neighboring feature points located within the surrounding region.
Figure 21B:
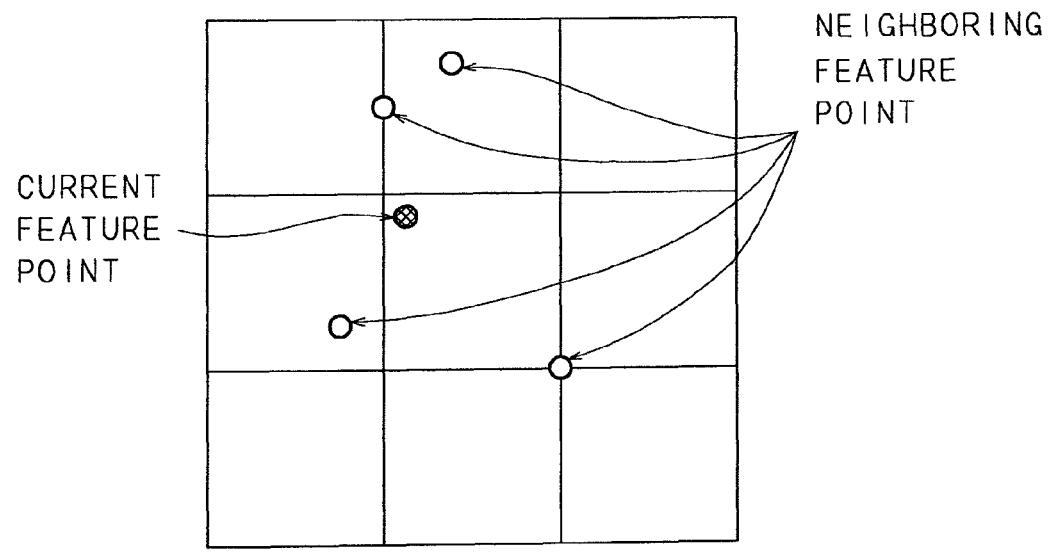

Next, the relationship between the number of neighboring feature points located within a surrounding region of a current feature point, and the change of the surrounding region will be described. FIGS. 21A and 21B are explanatory diagrams each showing the relationship between the mask size of a surrounding region and neighboring feature points located within the surrounding region.

For example, when one of the feature points extracted by the pixel block setting section 2220 is identified as a current feature point, the features calculating section 222 sets pixel blocks so that each has a mask size of 256 pixels×256 pixels, and sets, as a "surrounding region", neighboring eight pixel blocks with the pixel block including the current feature point located in the center. At this time, the features calculating section 222 can extract three neighboring feature points located within the surrounding region by the neighboring point extraction section 2221 (see FIG. 21A). Therefore, the features calculating section 222 changes the mask size of each pixel block by the pixel block setting section 2220 so that each has 512 pixels×512 pixels. The features calculating section 222 can extract four neighboring feature points located within the surrounding region by the neighboring point extraction section 2221 (see FIG. 21B). In other words, the number of the feature points is increased, thus making it possible to avoid the degradation in determination accuracy.

Figure 22:
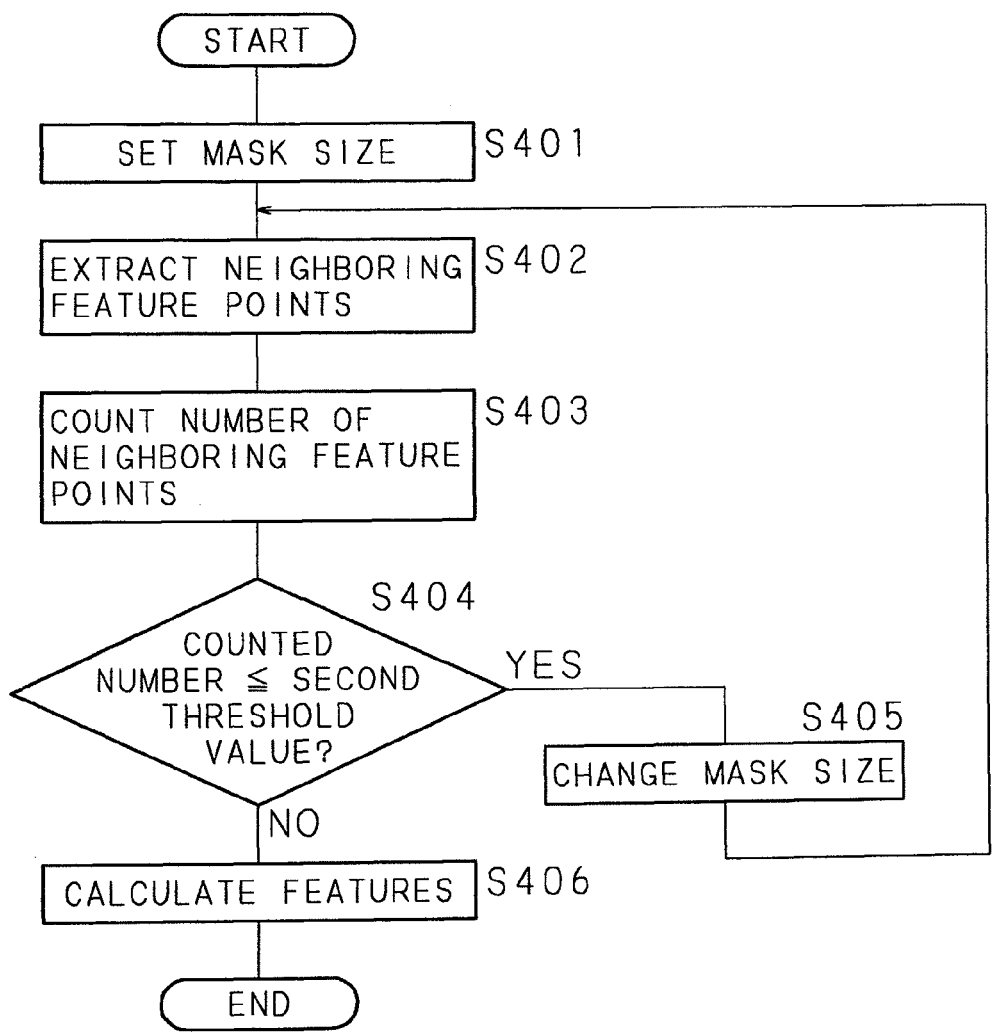
FIG. 22 is a flow chart showing a process procedure of the features calculating section.

Now, a surrounding region setting process, a neighboring feature point deciding process and a features calculating process of the features calculating section 222 will be described. FIG. 22 is a flow chart showing a process procedure of the features calculating section 222.

The features calculating section 222 sets a pixel block including one or a plurality of pixels of an image by the pixel block setting section 2220, and sets a mask size of the set pixel block (S401). The features calculating section 222 identifies, as a current feature point, one of the feature points extracted by the pixel block setting section 2220, sets, as a "surrounding region", neighboring eight pixel blocks with the pixel block including the current feature point located in the center, and outputs data, including the set pixel block, mask size and surrounding region, to the neighboring point extraction section 2221.

The features calculating section 222 receives, at the neighboring point extraction section 2221, the data outputted from the pixel block setting section 2220, and extracts the neighboring feature points located within the surrounding region based on the received data (S402). The features calculating section 222 counts the number of the neighboring feature points extracted by the neighboring point extraction section 2221 (S403), and determines whether the counted number is equal to or lower than the preset second threshold value (S404). As a result, when the number counted by the neighboring point extraction section 2221 has been determined to be equal to or lower than the second threshold value (when the answer is YES in S404), the features calculating section 222 outputs a signal indicative of this to the pixel block setting section 2220. The features calculating section 222 changes the mask size of the pixel block by the pixel block setting section 2220 that has received the signal (S405), and outputs data, including the changed mask size, to the neighboring point extraction section 2221. The features calculating section 222 repeats Step S402 in the neighboring point extraction section 2221.

On the other hand, when the number counted by the neighboring point extraction section 2221 has been determined to be above the second threshold value (when the answer is NO in S404), the features calculating section 222 outputs data concerning the extracted neighboring feature points to the features extraction section 2222. The features calculating section 222 receives, at the features extraction section 2222, the data outputted from the neighboring point extraction section 2221, and calculates features based on the received data (S406). The features calculating section 222 outputs the features, calculated by the features extraction section 2222, to the memory 225, thus ending the process.

It should be noted that, in the present embodiment, the features calculating section 222 executes features calculation by the features extraction section 2222 when a certain condition is met (see Step S404, and S406), but the present invention is not limited to this; alternatively, the features calculating section 222 may perform determination under a certain condition after having executed features calculation by the features extraction section 2222. Hereinafter, this alternative will be described as Example 3.

EXAMPLE 3

Figure 23:
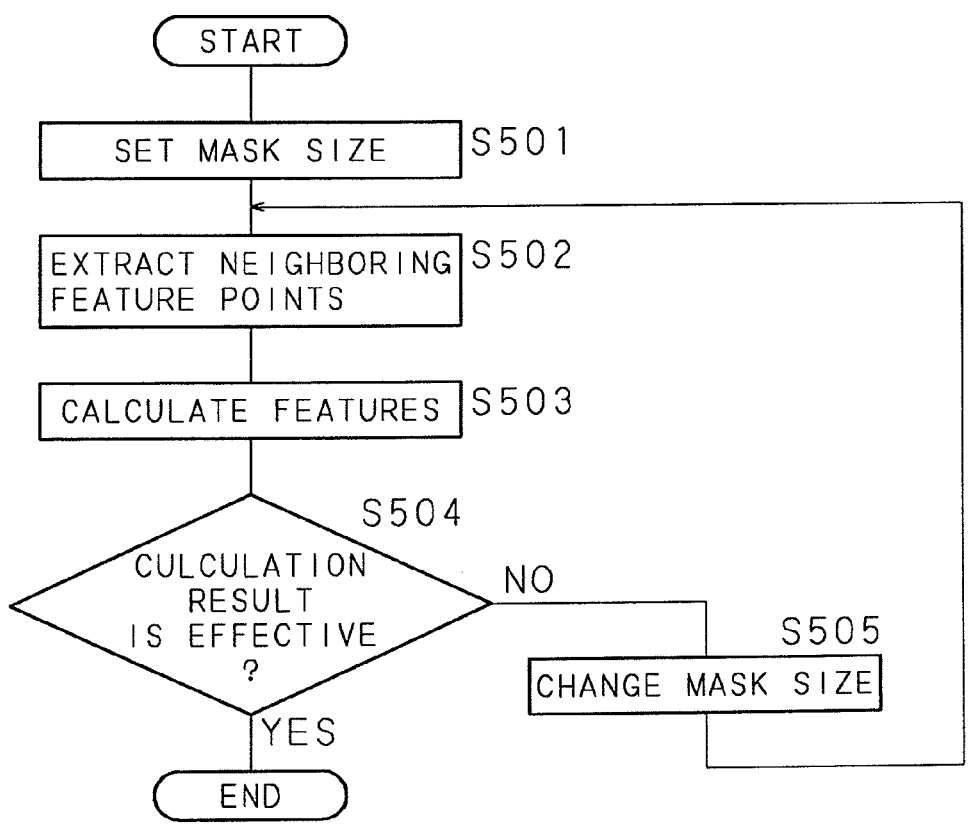
FIG. 23 is a flow chart showing a process procedure of a features calculating section according to Example 3.

FIG. 23 is a flow chart showing a process procedure of a features calculating section 222 according to Example 3. The features calculating section 222 according to Example 3 sets a pixel block including one or a plurality of pixels of an image by the pixel block setting section 2220, and sets a mask size of the set pixel block (S501). The features calculating section 222 identifies, as a current feature point, one of the feature points extracted by the pixel block setting section 2220, sets, as a "surrounding region", neighboring eight pixel blocks with the pixel block including the current feature point located in the center, and outputs data, including the set pixel block, mask size and surrounding region, to the neighboring point extraction section 2221.

The features calculating section 222 receives, at the neighboring point extraction section 2221, the data outputted from the pixel block setting section 2220, and extracts the neighboring feature points located within the surrounding region based on the received data (S502). The features calculating section 222 outputs data, concerning the neighboring feature points extracted by the neighboring point extraction section 2221, to the features extraction section 2222. The features calculating section 222 receives, at the features extraction section 2222, the data outputted from the neighboring point extraction section 2221, performs features calculation based on the received data (S503), and determines whether the calculated features is effective (S504). As a result, when the features calculated by the features extraction section 2222 has been determined to be not effective (when the answer is NO in S504), the features calculating section 222 outputs a signal indicative of this to the pixel block setting section 2220. The features calculating section 222 changes the mask size of the pixel block by the pixel block setting section 2220 that has received the signal (S505), and outputs data, including the changed mask size, to the neighboring point extraction section 2221. The features calculating section 222 executes the process of Step S502 in the neighboring point extraction section 2221.

On the other hand, when the features calculated by the features extraction section 2222 has been determined to be effective (when the answer is YES in S504), the features calculating section 222 outputs the calculated features to the memory 225, thus ending the process.

In this example, when only two feature points are secured even though the number of feature points to be extracted is four in Step S503, for example, and features calculation is performed based on these two feature points (S503), whether the calculated features is effective is determined as follows: the maximum coordinate value is assigned as an initial value to the two points that could not be secured, thereby determining whether a distance equal to or greater than a diagonal distance of the mask size is calculated. Thus, Example 3 has been described.

Furthermore, in the present embodiment, an example in which the mask size is changed without counting centroids for each pixel block line has been described, but the present invention is not limited to this; alternatively, the centroid may be counted for each pixel block line, and then the mask size may be changed in accordance with this result. Hereinafter, this alternative will be described as Example 4.

EXAMPLE 4

Figure 24:
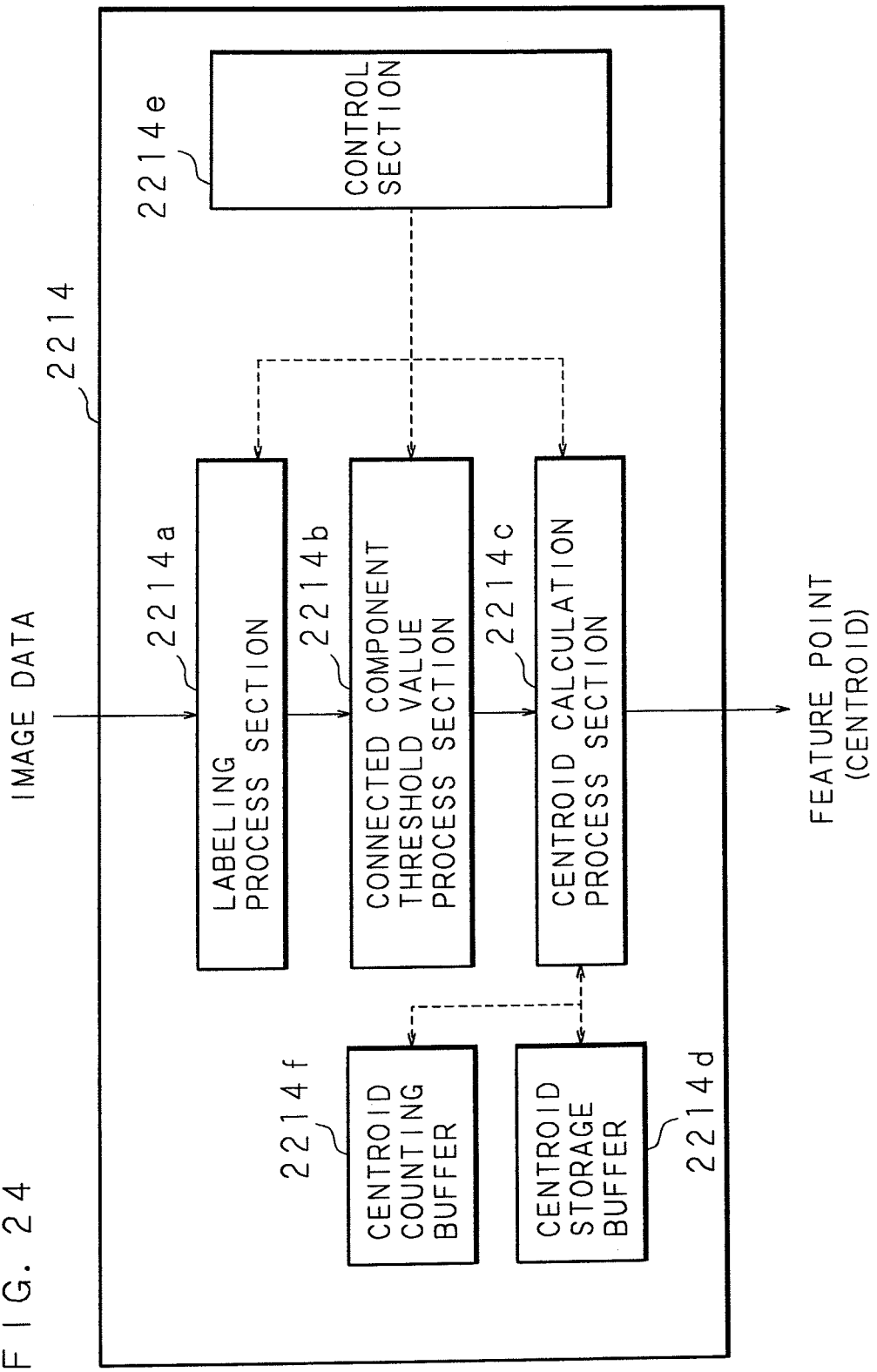
FIG. 24 is a schematic diagram showing a configuration of the centroid calculating section for counting centroids for each pixel block line.

FIG. 24 is a schematic diagram showing a configuration of a centroid calculating section 2214 for counting centroids for each pixel block line. The centroid calculating section 2214 includes a centroid counting buffer 2214*f*. The centroid counting buffer 2214*f* stores the number of centroids counted for each pixel block line, and is configured to add 1 to a counter associated with the associated pixel block when storing the centroid. It should be noted that the other configuration of the centroid calculating section 2214 is similar to that of the centroid calculating section 2214 shown in FIG. 6; therefore, the same reference characters are assigned thereto, and the description thereof will be omitted.

Figure 25:
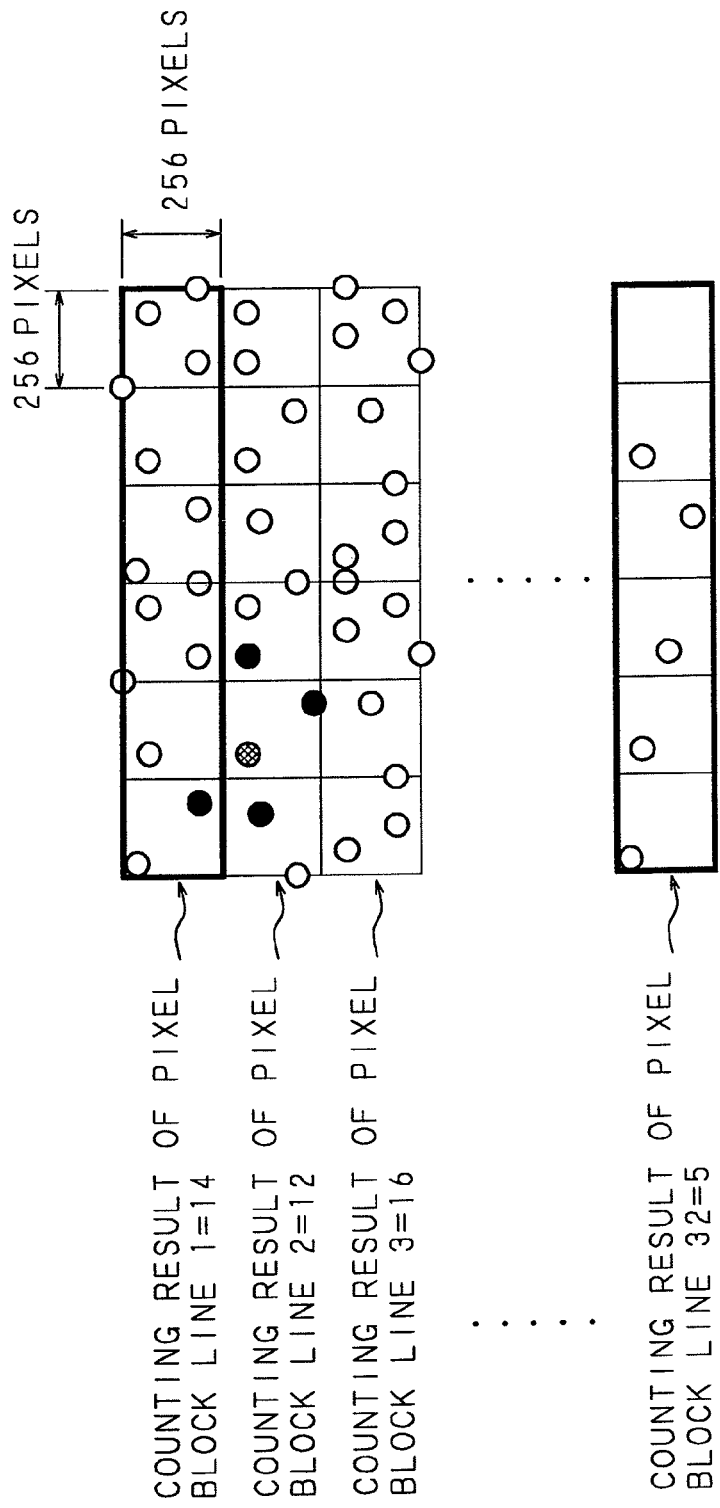
FIG. 25 is an explanatory diagram showing an example in which counting is performed using a centroid counting buffer.

FIG. 25 is an explanatory diagram showing an example in which counting is performed using the centroid counting buffer 2214*f*. FIG. 25 shows the counting result of a pixel block line 1, which is 14, the counting result of a pixel block line 2, which is 12, and the counting results of the subsequent pixel block lines up to a pixel block line 32. These counting results are stored in the centroid counting buffer 2214*f*.

Figure 26:
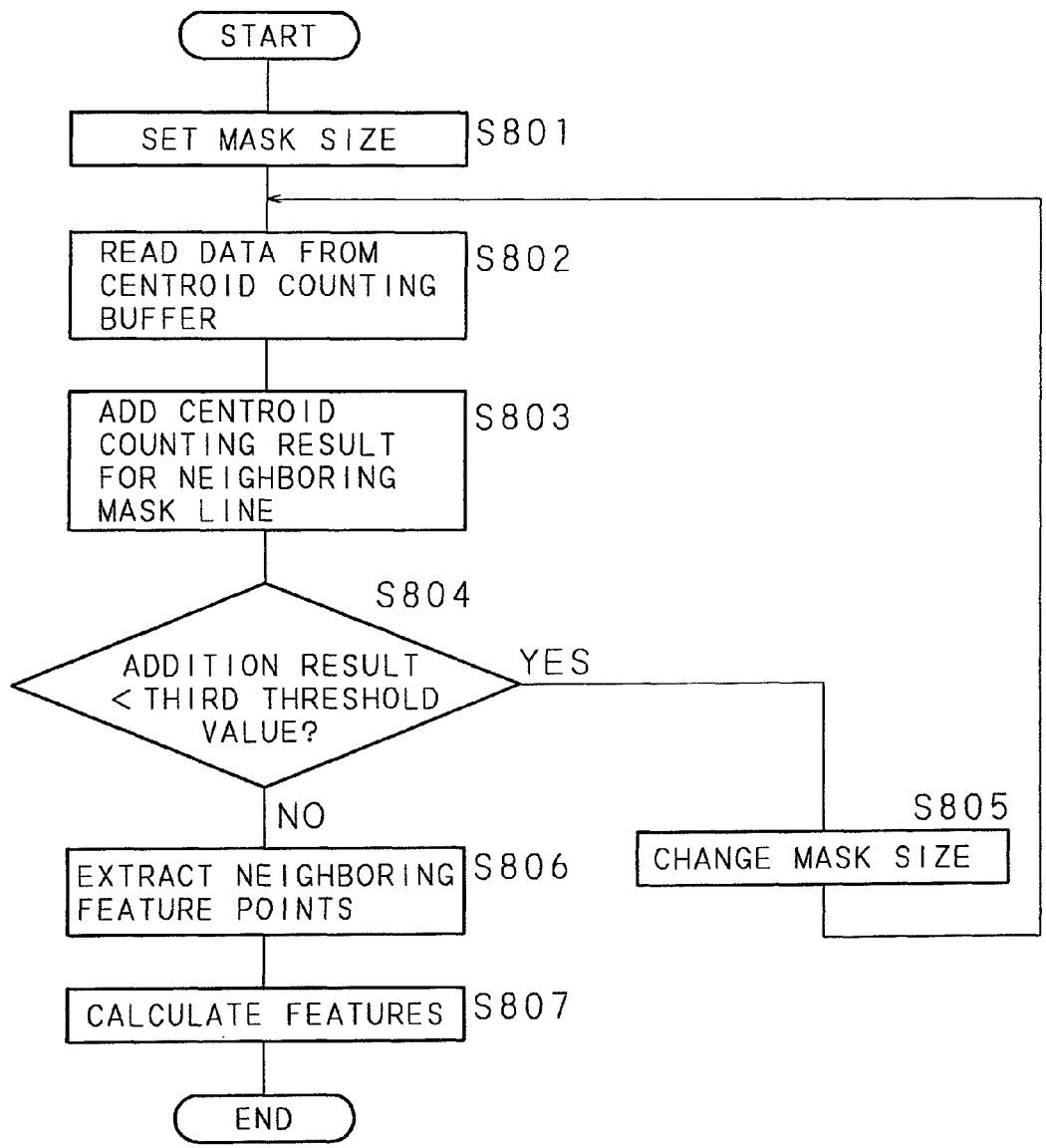
FIG. 26 is a flow chart showing a process procedure of a features calculating section according to Example 4.

FIG. 26 is a flow chart showing a process procedure of a features calculating section 222 according to Example 4. The features calculating section 222 initially sets a mask size associated with the pixel block stored in the centroid counting buffer 2214*f* (S801). The features calculating section 222 reads, from the centroid counting buffer 2214*f*, the centroid counting result associated with the pixel block line to be processed including the pixel block including a current feature point, and neighboring blocks (S802), and adds the centroid counting result read for the pixel block line, i.e., for the neighboring mask line (S803).

The features calculating section 222 determines whether the addition result is lower than a third threshold value (S804). In this example, when the four neighboring feature points are to be extracted, features cannot be accurately calculated if a current feature point and four or more surrounding feature points do not exist; therefore, the mask size has to be changed.

When the addition result has been determined to be lower than the third threshold value (when the answer is YES in S804), the features calculating section 222 changes the mask size to a larger one (S805) because neighboring feature points necessary for feature point extraction do not exist, and returns the procedure to Step S802 to read data from the centroid counting buffer 2214*f*. On the other hand, when the addition result has been determined to be equal to or higher than the third threshold value (when the answer is NO in S804), the features calculating section 222 extracts a neighboring feature point (S806), and outputs it to the features extraction section 2222. The features extraction section 2222 calculates features based on the received data (S807). Then, the features calculating section 222 ends the process.

Figure 27:
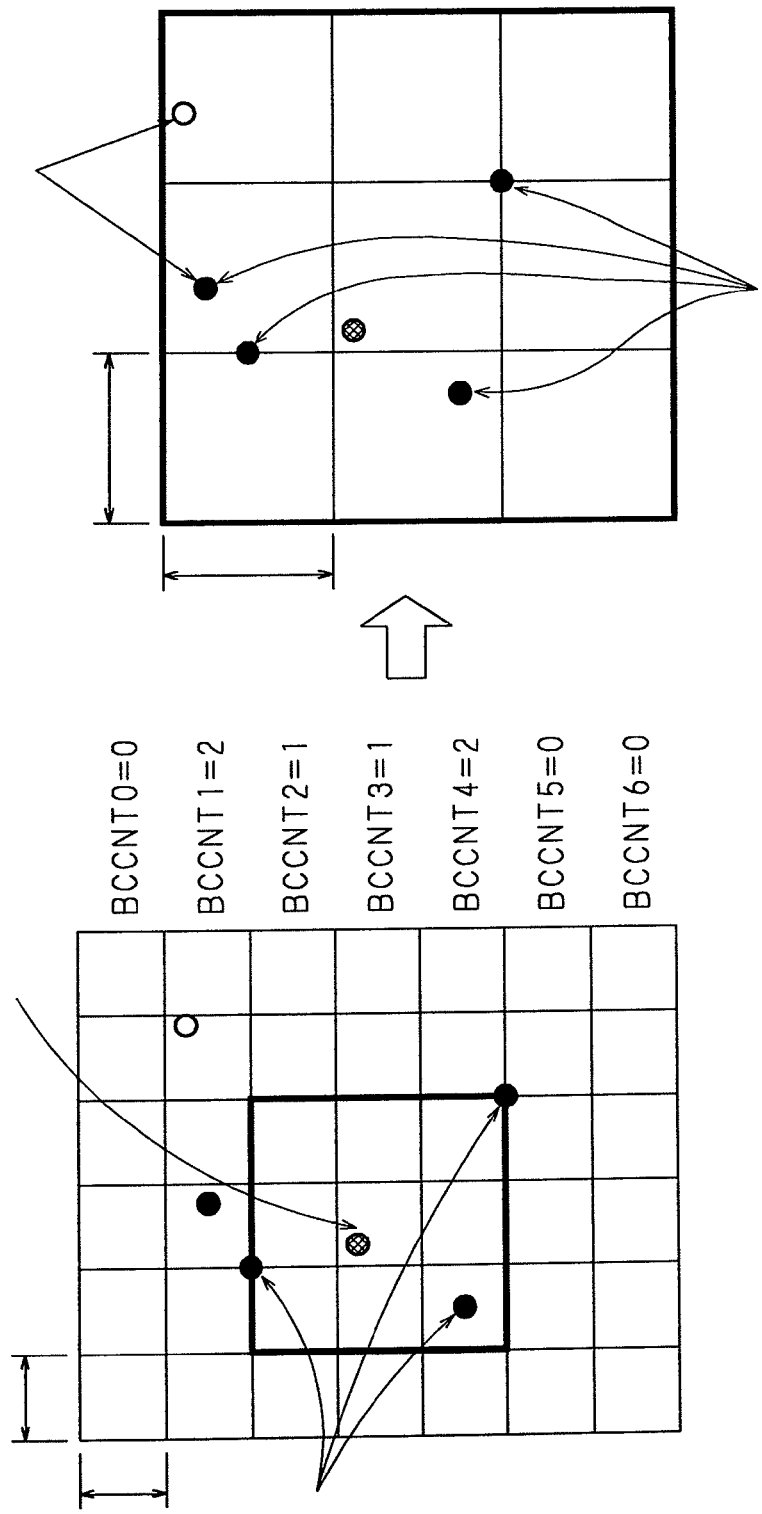
FIG. 27 is a schematic diagram for describing threshold value determination and mask size change.

FIG. 27 is a schematic diagram for describing threshold value determination and mask size change. In FIG. 27, mask size setting is set to 256 pixels×256 pixels. In this case, the count number for a pixel block line including a current feature point is "BCCNT3=1", and the count numbers for pixel block lines including surrounding blocks are "BCCNT2=1" and "BCCNT4=2"; therefore, the addition result is 4. Further, the third threshold value (TH_SPREAD) is represented by the following equation: four neighboring feature points+one current feature point=5. Hence, the features calculating section 222 determines that the addition result is lower than the third threshold value (see YES in S804), and changes the initially set mask size from 256 pixels×256 pixels to 512 pixels×512 pixels. Thus, the four neighboring feature points can be secured.

It should be noted that the above-described document image may be divided, the lower limit value of a connected region may be set in each divided region, the centroid counting result, associated with the pixel block line to be processed including a pixel block including a current feature point and surrounding blocks, may be read from the centroid counting buffer 2214*f* and added in each divided region, and the mask size may be changed when the addition result is equal to or lower than the second threshold value.

Further, the centroid counting result, associated with the pixel block line to be processed including the pixel block including the current feature point and surrounding blocks, may be read from the centroid counting buffer 2214*f* and added, and when the addition result is lower than the third threshold value, the lower limit value of the number of pixels for extraction of a connected region from which feature points are obtained, or the lower limit value of the number of pixels and mask size for extraction of a connected region from which feature points are obtained may be changed.

Furthermore, a plurality of the pixel number lower limit values for extraction of a connected region from which feature points are obtained may be set, and when the largest number of the feature points counted is lower than the third threshold value, the mask size may be changed. Thus, Example 4 has been described.

Next, the relationship between the number of neighboring feature points located within a surrounding region of a current feature point, and the change of the surrounding region will be described based on Example 4. FIG. 28 is an explanatory diagram showing the relationship between the number of pixel blocks in a surrounding region and neighboring feature points located within the surrounding region.

For example, when one of the feature points extracted by the pixel block setting section 2220 is identified as a current feature point, the features calculating section 222 sets pixel blocks so that each has a reference block number of 3×3, and sets, as a "surrounding region", neighboring pixel blocks with the pixel block including the current feature point located in the center. At this time, the features calculating section 222 can extract three neighboring feature points located within the surrounding region by the neighboring point extraction section 2221 (see FIG. 21A). Therefore, the features calculating section 222 changes the reference block number for the pixel blocks to be 5×5 by the pixel block setting section 2220. As a result, the features calculating section 222 can extract four neighboring feature points located within the surrounding region by the neighboring point extraction section 2221 (see FIG. 21), and since the number of the feature points is increased, the determination accuracy degradation can be avoided.

Figure 29:
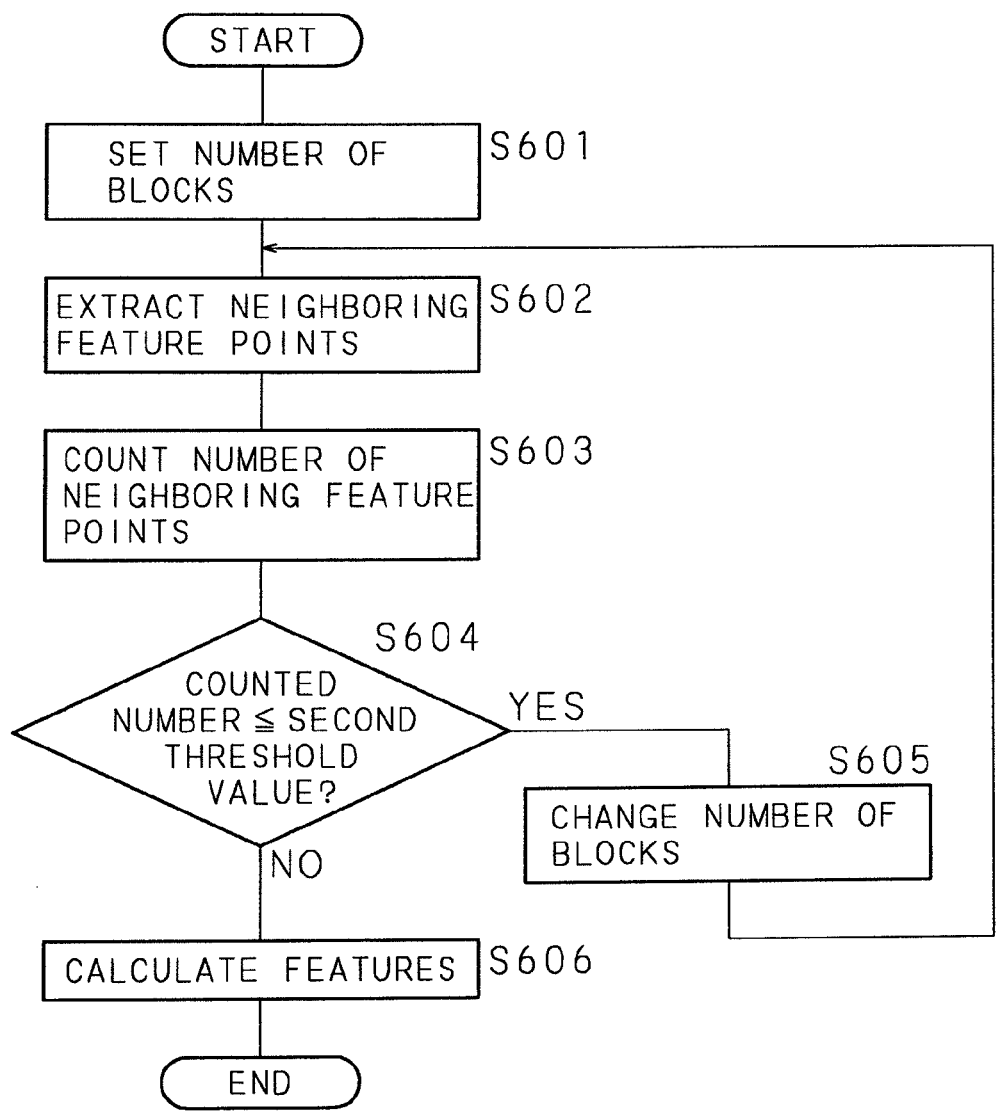
FIG. 29 is a flow chart showing a process procedure of a features calculating section according to Example 4.

Now, a surrounding region setting process, a neighboring feature point deciding process and a features calculating process of the features calculating section 222 will be described. FIG. 29 is a flow chart showing a process procedure of the features calculating section 222 according to Example 4.

The features calculating section 222 sets a pixel block including one or a plurality of pixels of an image by the pixel block setting section 2220, and sets a reference block number for the set pixel blocks (S601). The features calculating section 222 identifies, as a current feature point, one of the feature points extracted by the pixel block setting section 2220, sets, as a "surrounding region", neighboring pixel blocks with the pixel block including the current feature point located in the center, and outputs data, including the set pixel blocks, reference block number and surrounding region, to the neighboring point extraction section 2221.

The features calculating section 222 receives, at the neighboring point extraction section 2221, the data outputted from the pixel block setting section 2220, extracts the neighboring feature points located within the surrounding region based on the received data (S602), counts the number of the extracted neighboring feature points (S603), and determines whether the counted number is equal to or lower than the preset second threshold value (S604). As a result, when the number counted by the neighboring point extraction section 2221 has been determined to be equal to or lower than the second threshold value (when the answer is YES in S604), the features calculating section 222 outputs a signal indicative of this to the pixel block setting section 2220. The features calculating section 222 changes the reference block number for the pixel blocks by the pixel block setting section 2220 that has received the signal (S605), and outputs data, including the changed reference block number, to the neighboring point extraction section 2221. The features calculating section 222 performs Step S602 in the neighboring point extraction section 2221.

On the other hand, when the number counted by the neighboring point extraction section 2221 has been determined to be above the second threshold value (when the answer is NO in S604), the features calculating section 222 outputs data concerning the extracted neighboring feature points to the features extraction section 2222. The features calculating section 222 receives, at the features extraction section 2222, the data outputted from the neighboring point extraction section 2221, calculates features based on the received data (S606), and outputs the calculated features to the memory 225, thus ending the process. Thus, the description has been made based on Example 4.

It should be noted that, in the description made based on Example 4, an example in which the features calculating section 222 executes features calculation by the features extraction section 2222 when a certain condition is met has been described (see Step S604, and S606), but the present invention is not limited to this; alternatively, the features calculating section 222 may perform determination under a certain condition after having executed features calculation by the features extraction section 2222. Hereinafter, this alternative will be described as Example 5.

EXAMPLE 5

Figure 30:
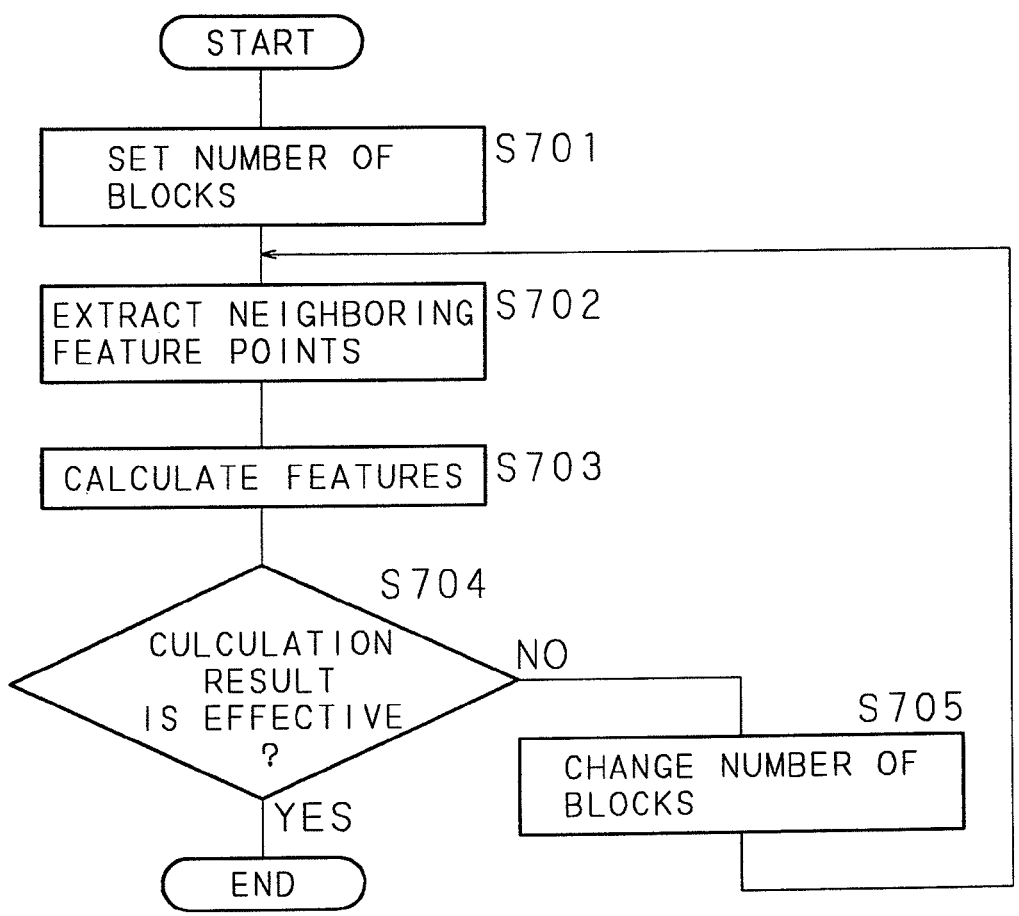
FIG. 30 is a flow chart showing a process procedure of a features calculating section according to Example 5.

FIG. 30 is a flow chart showing a process procedure of a features calculating section 222 according to Example 5. The features calculating section 222 sets a pixel block including one or a plurality of pixels of an image by the pixel block setting section 2220, and sets a reference block number for the set pixel block (S701). The features calculating section 222 identifies, as a current feature point, one of the feature points extracted by the pixel block setting section 2220, sets, as a "surrounding region", neighboring pixel blocks with the pixel block including the current feature point located in the center, and outputs data, including the set pixel blocks, reference block number and surrounding region, to the neighboring point extraction section 2221.

The features calculating section 222 receives, at the neighboring point extraction section 2221, the data outputted from the pixel block setting section 2220, and extracts the neighboring feature points located within the surrounding region based on the received data (S702). The features calculating section 222 outputs data, concerning the neighboring feature points extracted by the neighboring point extraction section 2221, to the features extraction section 2222. The features calculating section 222 receives, at the features extraction section 2222, the data outputted from the neighboring point extraction section 2221, performs features calculation based on the received data (S703), and determines whether the calculated features is effective (S704). As a result, when the features calculated by the features extraction section 2222 has been determined to be not effective (when the answer is NO in S704), the features calculating section 222 outputs a signal indicative of this to the pixel block setting section 2220. The features calculating section 222 changes the reference block number for the pixel blocks by the pixel block setting section 2220 that has received the signal (S705), and outputs data, including the changed reference block number, to the neighboring point extraction section 2221. The features calculating section 222 performs Step S702 in the neighboring point extraction section 2221.

On the other hand, when the features calculated by the features extraction section 2222 has been determined to be effective (when the answer is YES in S704), the features calculating section 222 outputs the calculated features to the memory 225, thus ending the process. Thus, Example 5 has been described.

It should be noted that, in the present embodiment, an example in which the features calculating section 222 performs the surrounding region setting process, neighboring feature point extracting process and features calculating process in a serial manner has been described, but the present invention is not limited to this; alternatively, a series of processes may be performed based on a plurality of different mask sizes or reference block numbers, the process by which the number of the neighboring feature points becomes the largest may be selected, and features may be calculated based on data resulting from the selected process. Hereinafter, this alternative will be described as Example 6.

EXAMPLE 6

Figure 31:
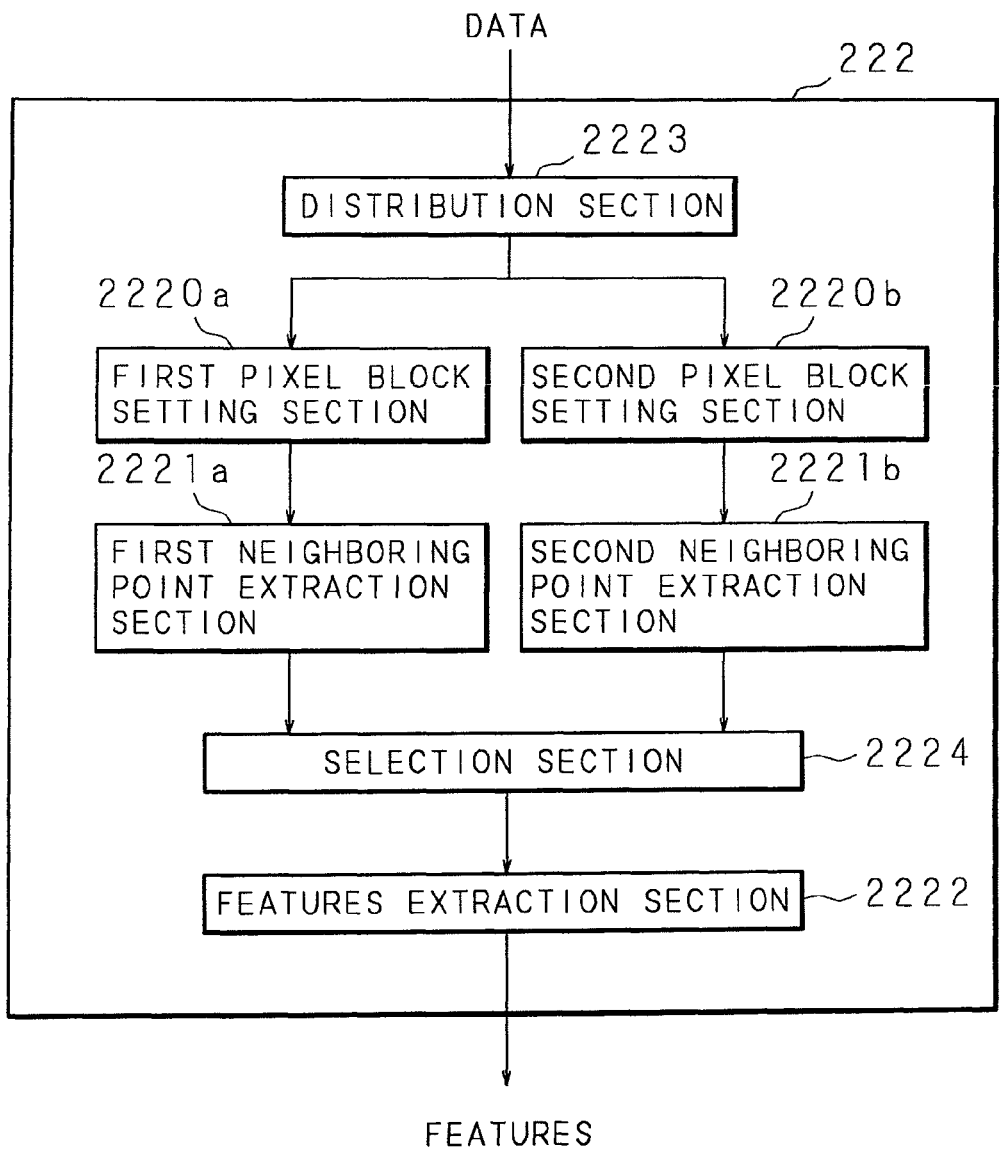
FIG. 31 is a schematic diagram showing a configuration of a features calculating section according to Example 6.

FIG. 31 is a schematic diagram showing a configuration of a features calculating section 222 according to Example 6. In Example 6, a pixel block setting section 2220 includes: a first pixel block setting section 2220a; and a second pixel block setting section 2220b, a neighboring point extraction section 2221 includes: a first neighboring point extraction section 2221a; and a second neighboring point extraction section 2221b, and a distribution section 2223 and a selection section 2224 are further provided.

The distribution section 2223 receives data of feature points stored in the memory 225, and distributes the received data to the first pixel block setting section 2220a and to the second pixel block setting section 2220b. The first pixel block setting section 2220a (and the second pixel block setting section 2220b) each set a pixel block including one or a plurality of pixels of an image, set mask size or reference block number for the set pixel blocks, identify one of the extracted feature points as a current feature point, set as a "surrounding region", neighboring pixel blocks with the pixel block including the current feature point located in the center, and output data, including the set pixel blocks, mask size or reference block number as well as surrounding region, to the first neighboring point extraction section 2221a (and the second neighboring point extraction section 2221b). The first neighboring point extraction section 2221a (and the second neighboring point extraction section 2221b) each receive the data outputted from the first pixel block setting section 2220a (and the second pixel block setting section 2220b), extract the neighboring feature points located within the surrounding region based on the received data, count the number of the extracted neighboring feature points, determine whether the counted number is equal to or lower than the second threshold value, and output the determination results to the selection section 2224.

The selection section 2224 receives the determination results outputted from the first neighboring point extraction section 2221a (and the second neighboring point extraction section 2221b), selects, from among the received determination results, one in which the counted number has been determined to be above the second threshold value (one in which the number is larger if both of the results exceed the second threshold value), allows data concerning the neighboring feature points to be outputted from the neighboring point extraction section, which has derived the selected determination result, to the features extraction section 2222. The features extraction section 2222 receives the data outputted from the neighboring point extraction section, calculates features based on the received data, and outputs the calculated features to the memory 225. Thus, Example 6 has been described.

Further, in the present embodiment, an example in which the reference block number is changed without counting centroids for each pixel block line has been described, but the present invention is not limited to this; alternatively, the centroids may be counted for each pixel block line, and then the reference block number may be changed in accordance with this result. Hereinafter, this alternative will be described as Example 7.

EXAMPLE 7

In Example 7, the configuration of the centroid calculating section 2214 for counting centroids for each pixel block line is similar to that of FIG. 24; therefore, the same reference characters are assigned thereto, and the description thereof will be omitted.

Figure 32:
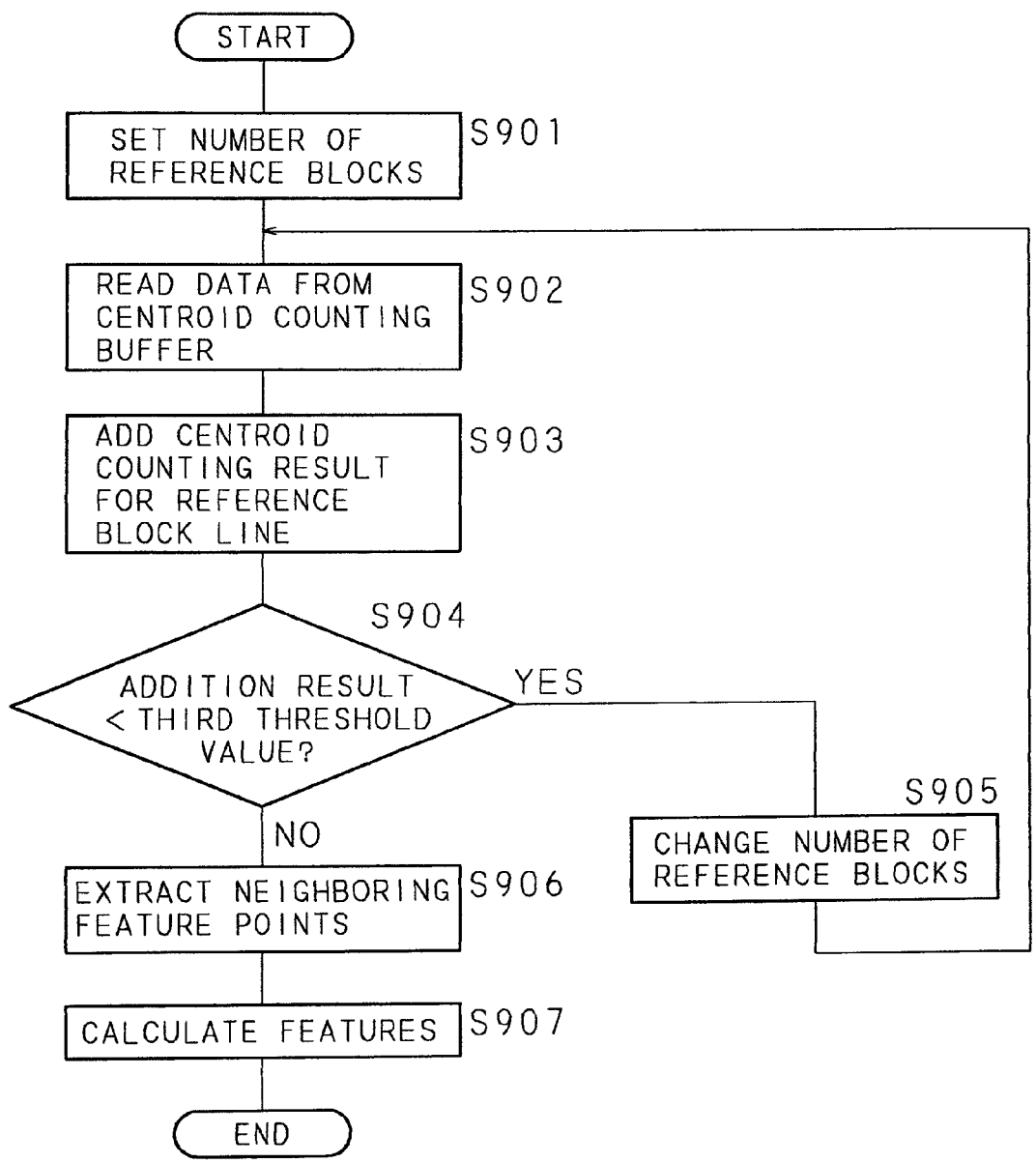
FIG. 32 is a flow chart showing a process procedure of a features calculating section according to Example 7.

FIG. 32 is a flow chart showing a process procedure of a features calculating section 222 according to Example 7. The features calculating section 222 initially sets the number of blocks to be referenced for each pixel block stored in the centroid counting buffer 2214f (S901). The features calculating section 222 reads, from the centroid counting buffer 2214f, the centroid counting result associated with the pixel block line to be processed in which the pixel block including a current feature point, and blocks to be referenced each exist (S902), and adds the centroid counting result read for the pixel block line, i.e., for the reference block line (S903).

The features calculating section 222 determines whether the addition result is lower than the third threshold value (S904). In this example, when four neighboring feature points are to be extracted, features cannot be accurately calculated if a current feature point and four or more surrounding feature points do not exist; therefore, the reference block number has to be changed. When the addition result has been determined to be lower than the third threshold value (when the answer is YES in S904), the features calculating section 222 changes the reference block number to a larger number (S905) because neighboring feature points necessary for feature point extraction do not exist, and returns the procedure to Step S902 to read data from the centroid counting buffer 2214f.

On the other hand, when the addition result has been determined to be equal to or higher than the third threshold value (when the answer is NO in S904), the features calculating section 222 extracts a neighboring feature point (S906), and outputs it to the features extraction section 2222. The features extraction section 2222 calculates features based on the received data (S907). Then, the features calculating section 222 ends the process.

Figure 33:
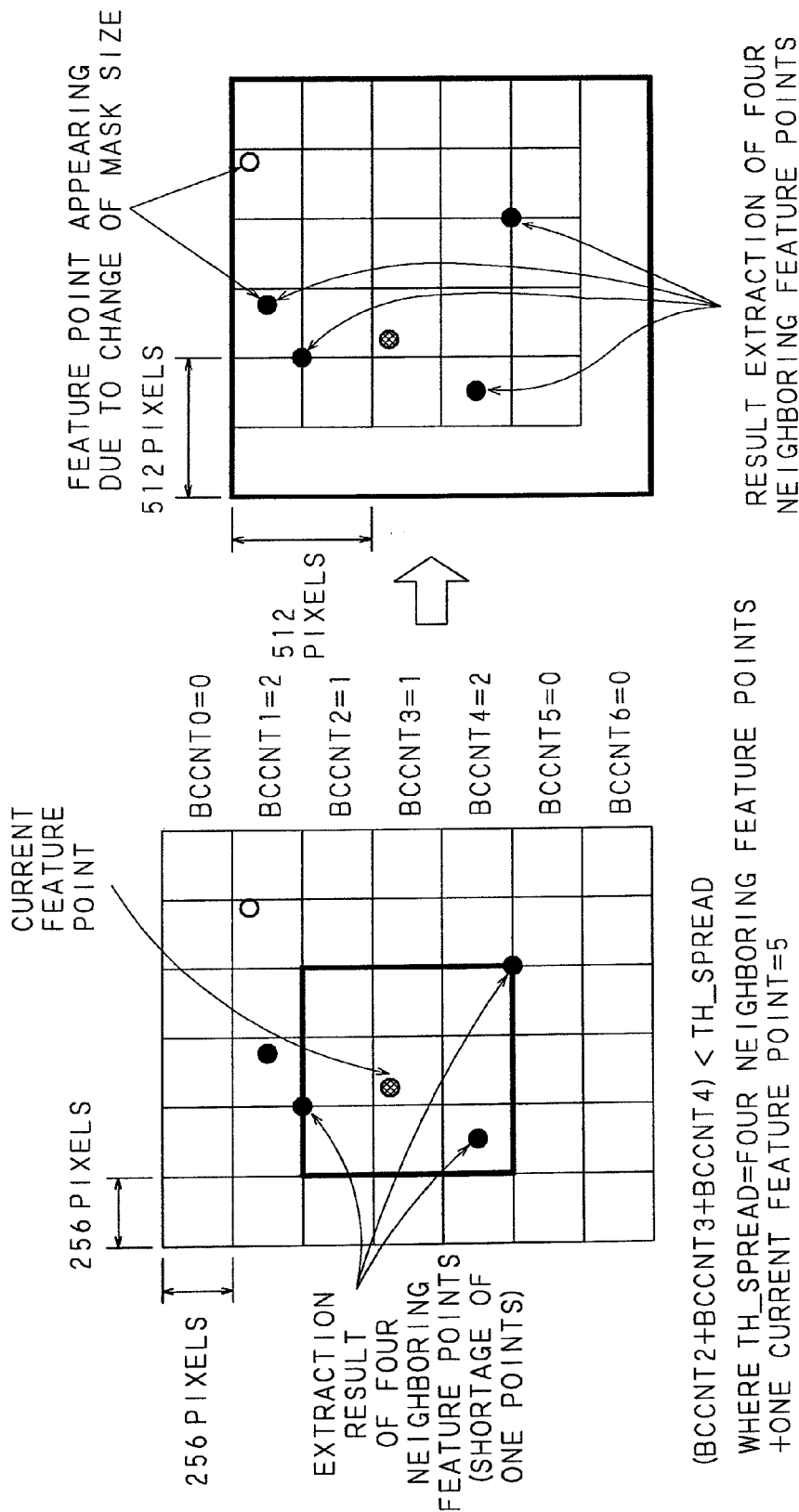
FIG. 33 is a schematic diagram for describing threshold value determination and the change of the number of reference blocks.
Figure 35A:
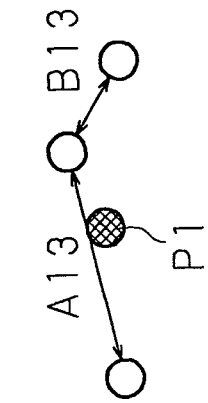
FIGS. 35A to 35C are explanatory diagrams each showing an example of invariant calculation using the current feature point.
Figure 35B:
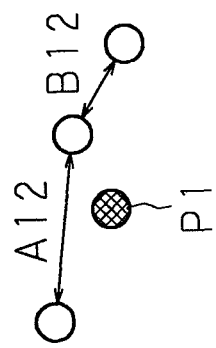
Figure 35C:
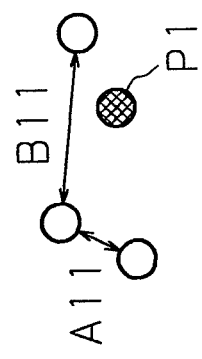
Figure 38B:
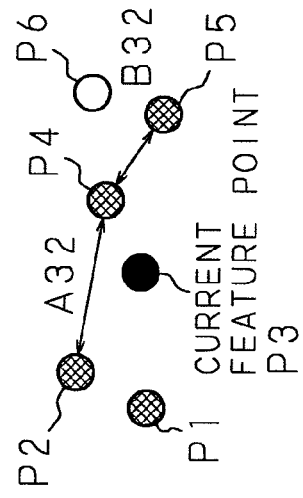
FIGS. 38A to 38D are explanatory diagrams each showing an example of invariant calculation using the current feature point.
Figure 38D:
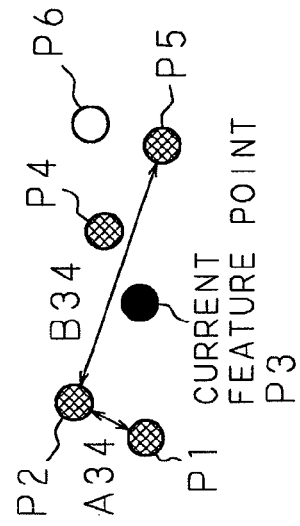
Figure 38A:
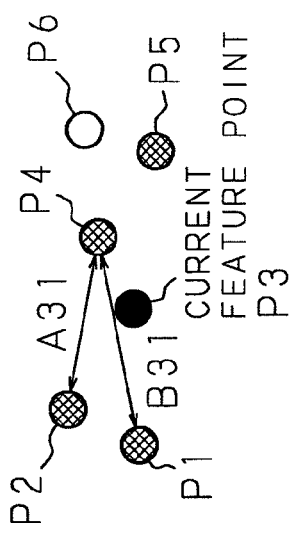
Figure 38C:
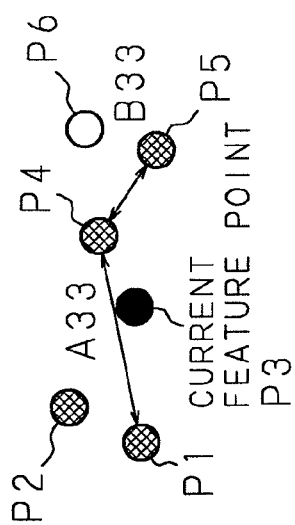

FIG. 33 is a schematic diagram for describing threshold value determination and the change of the number of reference blocks. In FIG. 33, reference block number setting is set to 9 (3×3 mask). In this case, the count number for a pixel block line including a current feature point is "BCCNT3=1", and the count numbers for pixel block lines including reference blocks are "BCCNT2=1" and "BCCNT4=2"; therefore, the addition result is 4. Further, the third threshold value (TH_SPREAD) is represented by the following equation: four neighboring feature points+one current feature point=5. Hence, the features calculating section 222 determines that the addition result is lower than the third threshold value (see YES in S904), and changes the initially set reference block number from 9 (3×3 mask) to 25 (5×5 mask). Thus, the four neighboring feature points can be secured.

It should be noted that the above-described document image may be divided, the lower limit value of a connected region may be set in each divided region, the centroid counting result, associated with the pixel block line to be processed including a pixel block including a current point and surrounding blocks, may be read from the centroid counting buffer 2214f and added in each divided region, and the reference block number may be changed when the addition result is equal to or lower than the second threshold value.

Further, the centroid counting result, associated with the pixel block line to be processed including the pixel block including the current point and the surrounding blocks, may be read from the centroid counting buffer 2214f and added, and when the addition result is lower than the third threshold value, the lower limit value of the number of pixels for extraction of a connected region from which feature points are obtained, or the lower limit value of the number of pixels and the reference block number for extraction of a connected region from which feature points are obtained may be changed.

Furthermore, a plurality of the pixel number lower limit values for extraction of a connected region from which feature points are obtained may be set, and when the largest number of the feature points counted is lower than the third threshold value, the reference block number may be changed. Thus, Example 7 has been described.

Next, the features calculating process executed by the features calculating section 222 in Step S406, for example, will be described. FIG. 34 is an explanatory diagram showing the relationship between current feature points and neighboring feature points, FIGS. 35A to 35C and FIGS. 36A to 36C are explanatory diagrams each showing an example of invariant calculation using the current feature point, and FIGS. 37A and 37B are explanatory diagrams each showing a structure of a hash table.

Based on the data received, at the features extraction section 2222, from the memory 225, the features calculating section 222 extracts four feature points located within a surrounding region S1, for example, with respect to a current feature point P1 in ascending order of distance from the current feature point P1 (a current feature point P2 serves as a neighboring feature point). Further, with respect to the current feature point P2, four feature points located within a surrounding region S2 are extracted in ascending order of distance from the current feature point P2 in the same manner as described above (the current feature point P1 serves as a neighboring feature point).

The features calculating section 222 selects, from among the four feature points extracted by the features extraction section 2222, three feature points and calculates an invariant in the manner described later. It should be noted that the number of the feature points to be selected is not limited to three, but the number of the feature points to be selected may be four or five.

Three neighboring feature points are selected from among the four neighboring feature points located within the surrounding region of the current feature point P1, and three kinds of invariants are each denoted by H1j (j=1, 2, 3). The invariants H1j are obtained as invariants H11, H12, and H13 using the following formula: H1j=A1j/B1j (see FIGS. 35A to 35C). It should be noted that A1j and B1j each indicate the distance between feature points, and the distance between the feature points is calculated based on the coordinate values of respective surrounding feature points. Thus, even when the image is rotated, moved, or inclined, the invariant H11 and the like are kept constant, and therefore, the accuracy of image similarity determination performed using the invariants can be stabilized.

Further, three neighboring feature points are selected from among the four neighboring feature points located within the surrounding region of the current feature point P2, and three kinds of invariants are each denoted by H2j (j=1, 2, 3). The invariants H2j are obtained as invariants H21, H22, and H23 using the following formula: H2j=A2j/B2j (see FIGS. 36A to 36C). It should be noted that A2j and B2j each indicate the distance between feature points, and the distance between the feature points is calculated based on the coordinate values of respective surrounding feature points. Thus, even when the image is rotated, moved, or inclined, the invariant H21 and the like are kept constant, and therefore, the accuracy of image similarity determination performed using the invariants can be stabilized.

Furthermore, the features calculating section 222 calculates a hash value (feature) Hij based on the invariant by the features extraction section 2222. The hash value Hij is obtained by the following formula: $Hij=(Hi1\times10^2+Hi2\times10^1+Hi3\times10^0)/E$. It is to be noted that i is a natural number, and indicates the number of feature points, while E is a constant determined by the extent to which the remainder is set. For example, when E=10, the remainder falls within 1 to 9, which is the range within which the calculated hash value falls.

FIGS. 38A to 38D and FIGS. 39A to 39D are explanatory diagrams each showing an example of invariant calculation using the current feature point. As a method for calculating an invariant using a current feature point, as shown in FIGS. 38A to 38D, for example, four kinds of combinations may be selected from four points, i.e., surrounding feature points P1, P2, P4, and P5 of a current feature point P3, and similarly to the above-mentioned case, invariants H3j (j=1, 2, 3, 4) may be calculated by H3j=A3j/B3j. Also, when the current feature point is P4, four kinds of combinations may be selected from four points, i.e., surrounding feature points P2, P3, P5, and P6 of the current feature point P4 (see FIGS. 39A to 39D), and invariants H4j (j=1, 2, 3, 4) may be calculated by H4j=A4j/B4j in the similar manner. In this case, the hash value Hi is calculated by the following formula: $Hi=(Hi1\times10^3+Hi2\times10^2+Hi3\times10^1+Hi4\times10^0)/E$.

It should be noted that the above-described hash value as features is one example, and other hash function may be used. Furthermore, in the above-described example, the hash value is calculated based on three neighboring feature points, but the present invention is not limited to this; alternatively, the hash value may be calculated based on four or five neighboring feature points.

The calculated hash value is stored in a hash table in association with an index (FIG. 37A). In the hash table, image data of the other document to be matched is stored in advance, and the hash value is stored in association with an index indicative of this document. The hash table is stored in the memory 225. It should be noted that when hash values are the same (for example, H11 and H22), the corresponding two entries may be unified (see FIG. 37B). Furthermore, the image data of the other document to be matched is received via the image input apparatus 1 in advance, and stored in the hash table.

Next, a similarity determination process executed by the vote processing section 223 and the similarity determination processing section 224 will be described.

The vote processing section 223 receives features (hash value) outputted from the features calculating section 222, searches, based on the received features, the hash table stored in the memory 225, votes for the document indicated by the index associated with the features, and outputs the number of votes, obtained by accumulatively adding the votes, to the similarity determination processing section 224.

The similarity determination processing section 224 receives the number of votes outputted from the vote processing section 223, determines whether the received number of votes is equal to or higher than a set threshold value, and outputs the determination result, indicating that the image to be determined this time is similar to the other document image stored in the hash table, to the memory 225 when the number of votes has been determined to be equal to or higher than the threshold value. Further, when the number of votes is extremely higher compared with the threshold value, the similarity determination processing section 224 outputs the determination result, indicating that the image to be determined this time is identical to the other document image stored in the hash table, to the memory 225. On the other hand, when the number of votes has been determined to be lower than the threshold value, the similarity determination processing section 224 outputs the determination result indicating that the image to be determined this time is not similar to the other document image stored in the hash table. In accordance with the determination result, the control section executes predetermined processes such as inhibition of image output, inhibition of copying, and storage to a predetermined folder, for example.

It should be noted that the similarity determination process of the similarity determination processing section 224 is one example; for example, the number of obtained votes may be divided by the greatest number of obtained votes for each document so as to be normalized, and similarity determination may be performed based on this result.

Moreover, in the foregoing embodiment, there has been described an example in which the feature point extraction section 221 adjusts the number of centroids (feature points) to be calculated by performing threshold value determination in the centroid calculating section 2214, and further adjusts the number of feature points to be referenced by changing the mask size or reference block number for pixel blocks (see FIG. 8, FIG. 22 and the like), but the present invention is not limited to this; alternatively, the adjustment of the number of feature points may be carried out only by adjusting the number of centroids (feature points) to be calculated by threshold value determination performed by the centroid calculating section 2214 of the feature point extraction section 221.

The foregoing embodiment is implemented so that storage images and hash table are stored in the memory 225 in advance, but the present invention is not limited to this; alternatively, the storage images may be stored in a storage section of a server device connected to the image forming apparatus through a communication line (network), and the hash table may be stored in the memory 225 in a distributed manner.

Each section (each block) constituting the image matching process section 22 and the control section 226 included in the image forming apparatus is realized by software using a processor such as a CPU. Specifically, the image forming apparatus includes: a CPU (central processing unit) for executing instructions of control programs which realize each function; a ROM (read only memory) that stores the control programs; a RAM (random access memory) for expanding the control programs; and a storage device (memory product) such as a memory that stores the control programs and various data (which are not shown).

The object of the present invention is achieved by executing steps included in program codes of control programs of the multifunction peripheral (a program in an execute form, an intermediate code program, and a source program), serving as software that realizes the above-described functions. Furthermore, a memory product readable by a computer that records the control programs is inserted into the image forming apparatus, and this computer (or CPU or MPU) reads and executes program codes recorded in the memory product, thereby achieving the object.

The memory product, for example, includes: a tape system such as a magnetic tape or a cassette tape; a disk system including a magnetic disk such as a floppy (registered trademark) disk or a hard disk, or an optical disk such as a CD-ROM, an MO, an MD, a DVD or a CD-R; a card system such as an IC card (including a memory card) or an optical card; and a semiconductor memory system such as a mask ROM, an EPROM, an EEPROM or a flash ROM.

Moreover, a program may be supplied via a communication network by connecting the image forming apparatus to a communication network. Although not particularly limited, the communication network, for example, includes: the Internet; an intranet; an extranet; a LAN; an ISDN; a VAN; a CATV communication network; a virtual private network; a telephone network; a mobile communication network; and a satellite communication network. Furthermore, although not particularly limited, transmission media constituting the communication network, for example, includes: wired lines such as an IEEE1394, an USB, a power-line carrier, a cable TV line, a telephone line and an ADSL line; and wireless lines such as infrared rays including IrDA or a remote control, Bluetooth (registered trademark), an 802.11 wireless line, an HDR, a cellular telephone network, a satellite line, and a ground wave digital network. It should be noted that the present invention can also be realized in a form of a computer data signal embedded in a carrier wave, in which a program code is embodied by electronic transmission.

Further, each block of the image forming apparatus is not limited to one realized using software, but may be one configured by hardware logic, or may be a combination of hardware for performing part of processes, and a computation means for executing the control of the hardware and software for performing the remaining processes.

Furthermore, the computer system of the present invention may be implemented by: an image input apparatus such as a flat-bed scanner, a film scanner, or a digital camera; a computer for performing various processes, including the above-described similarity calculation process and similarity determination process, by loading a predetermined program thereon; an image display device such as a CRT display or a liquid crystal display for displaying computer-processed results; and an image forming apparatus such as a printer for outputting the computer-processed results onto a paper or the like. Moreover, as a communication means for connecting with a server, for example, via a network, a network card, a modem and the like may be provided.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method for identifying, from a binary image, a plurality of pixel regions where pixels determined to be having the same pixel values are adjacent to each other, extracting, based on a pixel coordinate value of the identified pixel region, a feature point of the pixel region, calculating features of an image based on the extracted feature point, and determining similarity among images based on the calculated features, the method comprising steps of:
    deciding a neighboring feature point located within a surrounding region of the extracted feature point;
    counting the number of the decided neighboring feature points;
    determining whether the counted number of the feature points is equal to or lower than a second threshold value;
    calculating the features based on the neighboring feature point when the counted number of the feature points has been determined to be above the second threshold value; and
    changing a range of the surrounding region when the counted number of the feature points has been determined to be equal to or lower than the second threshold value.

2. The image processing method of claim 1,
    wherein the surrounding region includes a pixel block including one or a plurality of the pixels of the binary image, and the change of the range of the surrounding region is carried out by changing a size of the pixel block or the number of blocks.

3. An image processing method for identifying, from a binary image, a plurality of pixel regions where pixels determined to be having the same pixel values are adjacent to each other, extracting, based on a pixel coordinate value of the identified pixel region, a feature point of the pixel region, calculating features of an image based on the extracted feature point, and determining similarity among images based on the calculated features, the method comprising steps of:

counting the number of the feature points within a predetermined range when extracting the feature point;
 extracting, from the counted feature points, a feature point included in a region to be processed;
 determining whether the number of the extracted feature points is lower than a third threshold value;
 calculating the features based on a neighboring feature point located within a surrounding region of the extracted feature point when the number of the extracted feature points has been determined to be equal to or higher than the third threshold value; and
 changing a range of the surrounding region when the number of the extracted feature points has been determined to be lower than the third threshold value.

4. The image processing method of claim 3,
 wherein the surrounding region includes a pixel block including one or a plurality of the pixels of the binary image, and the change of the range of the surrounding region is carried out by changing a size of the pixel block or the number of blocks.

5. An image processing apparatus for identifying, from a binary image, a plurality of pixel regions where pixels determined to be having the same pixel values are adjacent to each other, extracting, based on a pixel coordinate value of the identified pixel region, a feature point of the pixel region, calculating features of an image based on the extracted feature point, and determining similarity among images based on the calculated features, the apparatus comprising:

a deciding section for deciding a neighboring feature point located within a surrounding region of the extracted feature point;
 a feature point counting section for counting the number of the decided neighboring feature points; and
 a determination section for determining whether the counted number of the feature points is equal to or lower than a second threshold value,
 wherein the features is calculated based on the neighboring feature point when the counted number of the feature points has been determined to be above the second threshold value, and a range of the surrounding region is changed when the counted number of the feature points has been determined to be equal to or lower than the second threshold value.

6. The image processing apparatus of claim 5,
 wherein the surrounding region includes a pixel block including one or a plurality of the pixels of the binary image, and the change of the range of the surrounding region is carried out by changing a size of the pixel block or the number of blocks.

7. An image processing apparatus for identifying, from a binary image, a plurality of pixel regions where pixels determined to be having the same pixel values are adjacent to each other, extracting, based on a pixel coordinate value of the identified pixel region, a feature point of the pixel region, calculating features of an image based on the extracted feature point, and determining similarity among images based on the calculated features, the apparatus comprising:

a feature point counting section for counting the number of the feature points within a predetermined range when extracting the feature point;
 an extraction section for extracting, from the counted feature points, a feature point included in a region to be processed; and
 a determination section for determining whether the number of the extracted feature points is lower than a third threshold value,
 wherein the features is calculated based on a neighboring feature point located within a surrounding region of the extracted feature points when the number of the extracted feature points has been determined to be equal to or higher than the third threshold value, and a range of the surrounding region is changed when the number of the extracted points has been determined to be lower than the third threshold value.

8. The image processing apparatus of claim 7,
 wherein the surrounding region includes a pixel block including one or a plurality of the pixels of the binary image, and the change of the range of the surrounding region is carried out by changing a size of the pixel block or the number of blocks.

9. An image forming apparatus comprising:
 the image processing apparatus of claim 5; and
 an image output apparatus for forming an image processed by the image processing apparatus.

10. An image forming apparatus comprising:
 the image processing apparatus of claim 7; and
 an image output apparatus for forming an image processed by the image processing apparatus.

11. A computer-readable memory product that stores a computer program for causing a computer to identify, from a binary image, a plurality of pixel regions where pixels determined to be having the same pixel values are adjacent to each other, to extract, based on a pixel coordinate value of the identified pixel region, a feature point of the pixel region, to calculate features of an image based on the extracted feature point, and to determine similarity among images based on the calculated features,
 wherein the computer program comprises steps of;
 causing the computer to decide a neighboring feature point located within a surrounding region of the extracted feature point;
 causing the computer to count the number of the decided neighboring feature points;
 causing the computer to determine whether the counted number of the feature points is equal to or lower than a second threshold value;
 causing the computer to calculate the features based on the neighboring feature point when the counted number of the feature points has been determined to be above the second threshold value; and
 causing the computer to change a range of the surrounding region when the counted number of the feature points has been determined to be equal to or lower than the second threshold value.

12. A computer-readable memory product that stores a computer program for causing a computer to identify, from a binary image, a plurality of pixel regions where pixels determined to be having the same pixel values are adjacent to each other, to extract, based on a pixel coordinate value of the identified pixel region, a feature point of the pixel region, to calculate features of an image based on the extracted feature point, and to determine similarity among images based on the calculated features,
 wherein the computer program comprises steps of;
 causing the computer to count the number of the feature points within a predetermined range when extracting the feature point;
 causing the computer to extract, from the counted feature points, a feature point included in a region to be processed;

causing the computer to determine whether the number of the extracted feature points is lower than a third threshold value;

causing the computer to calculate the features based on a neighboring feature point located within a surrounding region of the extracted feature points when the number of the extracted feature points has been determined to be equal to or higher than the third threshold value; and causing the computer to change a range of the surrounding region when the number of the extracted feature points has been determined to be lower than the third threshold value.

* * * * *